(12) United States Patent
Shorser

(10) Patent No.: US 12,499,410 B2
(45) Date of Patent: Dec. 16, 2025

(54) SYSTEMS AND METHODS FOR STRATEGIC ROUTING AND DISTRIBUTION OF ORDERS FOR MULTI-LOCATION MERCHANTS

(71) Applicant: Uber Technologies, Inc., San Francisco, CA (US)

(72) Inventor: Reuben Shorser, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 347 days.

(21) Appl. No.: 18/169,543

(22) Filed: Feb. 15, 2023

(65) Prior Publication Data
US 2024/0273458 A1    Aug. 15, 2024

(51) Int. Cl.
*G06Q 10/00* (2023.01)
*G06Q 10/0834* (2023.01)
*G06Q 10/0835* (2023.01)
*G06Q 10/087* (2023.01)

(52) U.S. Cl.
CPC ... *G06Q 10/08355* (2013.01); *G06Q 10/0834* (2013.01); *G06Q 10/087* (2013.01)

(58) Field of Classification Search
CPC ......... G06Q 10/0875; G06Q 10/08355; G06Q 10/0834; G06Q 10/087; G06Q 10/047; G06Q 10/083; G06Q 30/0639
See application file for complete search history.

(56) References Cited

U.S. PATENT DOCUMENTS

| | | |
|---|---|---|
| 2020/0394610 A1 | 12/2020 | Chopra et al. |
| 2021/0019694 A1 | 1/2021 | Dhesi et al. |
| 2021/0192648 A1* | 6/2021 | Bernstein ........... G06Q 10/0832 |
| 2022/0405693 A1 | 12/2022 | Reiss et al. |

OTHER PUBLICATIONS

International Search Report and Written Opinion for Application No. PCT/US2024/015908, mailed Apr. 19, 2024, 14 pages.

* cited by examiner

*Primary Examiner* — Rokib Masud
(74) *Attorney, Agent, or Firm* — Dority & Manning, P.A.

(57) ABSTRACT

Systems and methods for strategic routing and distribution of orders for multi-location merchants. The system can obtain data including a service request for multiple items and determine if the inventory at multiple store locations includes a first and second item. The method includes coordinating two couriers fulfilling the request. The method includes assigning a first courier to transport a first item from a first location to a second location and a second courier to transport a first item and second item from the second location to a destination location. The method includes determining a trigger time to send an assignment to a second courier device based on an estimated time for the second courier to travel to the second location and obtain the second item. The method includes automatically triggering transmission of the second assignment based on a progress of the first courier and the trigger time.

20 Claims, 15 Drawing Sheets

| COMPUTING DEVICE MEMORY 200 | |
|---|---|
| REQUEST IDENTIFIER | X999999 |
| USER PREFERENCES | X.XXX |
| CANDIDATE COURIERS | X.XXX |
| DROP-OFF LOCATION | X.XXX |
| MERCHANT DATA | X.XXX |

205 — REQUEST IDENTIFIER
210 — USER PREFERENCES
215 — CANDIDATE COURIERS
220 — DROP-OFF LOCATION
225 — MERCHANT DATA

| MERCHANT A 230 | |
|---|---|
| LOCATION | X.XXX |
| INVENTORY | X.XXX |
| HOURS | 8AM-1AM |
| ESTIMATED TIME TO PACK | X.XXX |

235 — LOCATION
240 — INVENTORY
245 — HOURS
250 — ESTIMATED TIME TO PACK

| MERCHANT A 230 | | |
|---|---|---|
| ITEM ID | QUANTITY | ESTIMATED TIME TO PACK |
| APPLE | 10    240A | 1 MIN 5 SEC    250A |
| ORANGE | 73    240B | 5 MIN 0 SEC    250B |
| DIET SODA | 100    240C | 2 MIN 33 SEC    250C |
| MILK | 52    240D | 0 MIN 30 SEC    250D |

| MERCHANT B 260 | |
|---|---|
| LOCATION | X.XXX |
| INVENTORY | X.XXX |
| HOURS | 8AM-1AM |
| ESTIMATED TIME TO PACK | X.XXX |

265 — LOCATION
270 — INVENTORY
275 — HOURS
280 — ESTIMATED TIME TO PACK

| MERCHANT B 260 | | |
|---|---|---|
| ITEM ID | QUANTITY | ESTIMATED TIME TO PACK |
| APPLE | 85    270A | 1 MIN 5 SEC    280A |
| ORANGE | 75    270B | 5 MIN 0 SEC    280B |
| MILK | 0    270C | 1 MIN 15 SEC    280C |
| EGGS | 10    270D | 0 MIN 15 SEC    280D |

FIG. 2

SYSTEMS AND METHODS FOR STRATEGIC ROUTING AND DISTRIBUTION OF ORDERS FOR MULTI-LOCATION MERCHANTS

FIELD

The present disclosure generally relates to strategic routing and distribution of orders for multi-location merchants. More particularly, the present disclosure is directed to facilitating the completion of a grocery delivery service request with multiple items from multiple locations associated with merchants.

BACKGROUND

Food delivery services allow a user to request a service that may be performed by a vehicle or courier. For instance, a user may request, through a grocery delivery service application, a grocery delivery service having a pick-up location, a drop-off location, and items for delivery. A courier can be assigned to perform the grocery delivery service for the user. This can include transporting the delivery of the items to the drop-off location.

SUMMARY

Aspects and advantages of embodiments of the present disclosure will be set forth in part in the following description, or may be learned from the description, or may be learned through practice of the embodiments.

One aspect of the present disclosure is directed to a computing system. The computing system includes one or more processors and one or more tangible, non-transitory, computer readable media that store instructions that are executable by the one or more processors to cause the computing system to perform operations. The operations include obtaining data indicative of a service request comprising a request for at least a first item and a second item to be transported to a destination location. The operations include determining that the first item is available at a first grocery location and unavailable at a second grocery location and that the second item is available at the second grocery location and unavailable at the first grocery location. The operations include transmitting first instructions to a first courier device associated with a first courier, wherein the first instructions can be executed by the first courier device to cause a first service assignment to be provided for display via a user interface of the first courier device, the first service assignment indicating the first courier is to transport the first item from the first grocery location to the second grocery location. The operations include determining an estimated time for a second courier to travel to the second grocery location and obtain the second item. The operations include based on the estimated time for the second courier to travel to the second grocery location and obtain the second item, determining a trigger time. The operations include obtaining location data indicative of progress of the first courier device along an expected route from a start location to the first grocery location and from the first grocery location to the second grocery location. The operations include, based on the progress of the first courier device along the expected route and the trigger time, automatically triggering transmission of second instructions to a second courier device associated with the second courier, wherein the second instructions can be executed by the second courier device to cause a second service assignment to be provided for display via a user interface of the second courier device, the second service assignment indicating the second courier is to transport items to the destination location.

Another Example aspect of the present disclosure is directed to a computer-implemented method. The method includes obtaining data indicative of a service request comprising a request for at least a first item and a second item to be transported to a destination location. The method includes determining that the first item is available at a first grocery location and unavailable at a second grocery location and that the second item is available at the second grocery location and unavailable at the first grocery location. The method includes transmitting first instructions to a first courier device associated with a first courier, wherein the first instructions can be executed by the first courier device to cause a first service assignment to be provided for display via a user interface of the first courier device, the first service assignment indicating the first courier is to transport the first item from the first grocery location to the second grocery location. The method includes determining an estimated time for a second courier to travel to the second grocery location and obtain the second item. The method includes based on the estimated time for the second courier to travel to the second grocery location and obtain the second item, determining a trigger time. The method includes obtaining location data indicative of progress of the first courier device along an expected route from a start location to the first grocery location and from the first grocery location to the second grocery location. The method includes, based on the progress of the first courier device along the expected route and the trigger time, automatically triggering transmission of second instructions to a second courier device associated with the second courier, wherein the second instructions can be executed by the second courier device to cause a second service assignment to be provided for display via a user interface of the second courier device, the second service assignment indicating the second courier is to transport items to the destination location.

Yet another example aspect of the present disclosure is directed to one or more non-transitory computer readable media storing instructions that are executable by one or more processors to perform operations. The operations include obtaining data indicative of a service request comprising a request for at least a first item and a second item to be transported to a destination location. The operations include determining that the first item is available at a first grocery location and unavailable at a second grocery location and that the second item is available at the second grocery location and unavailable at the first grocery location. The operations include transmitting first instructions to a first courier device associated with a first courier, wherein the first instructions can be executed by the first courier device to cause a first service assignment to be provided for display via a user interface of the first courier device, the first service assignment indicating the first courier is to transport the first item from the first grocery location to the second grocery location. The operations include determining an estimated time for a second courier to travel to the second grocery location and obtain the second item. The operations include based on the estimated time for the second courier to travel to the second grocery location and obtain the second item, determining a trigger time. The operations include obtaining location data indicative of progress of the first courier device along an expected route from a start location to the first grocery location and from the first grocery location to the second grocery location. The operations include, based on the progress of the first courier device along the expected route and the trigger time, automatically triggering transmission of second instructions to a second courier device associated with the second courier, wherein the second instructions can be executed by the second courier device to cause a second service assignment to be provided for display via a user interface of the second courier device, the second service assignment indicating the second courier is to transport items to the destination location.

BRIEF DESCRIPTION OF THE DRAWINGS

Detailed discussion of embodiments directed to one of ordinary skill in the art are set forth in the specification, which makes reference to the appended figures, in which:

FIG. 2 depicts an example data structure of a memory according to example embodiments of the present disclosure.

DETAILED DESCRIPTION

Figure 1:
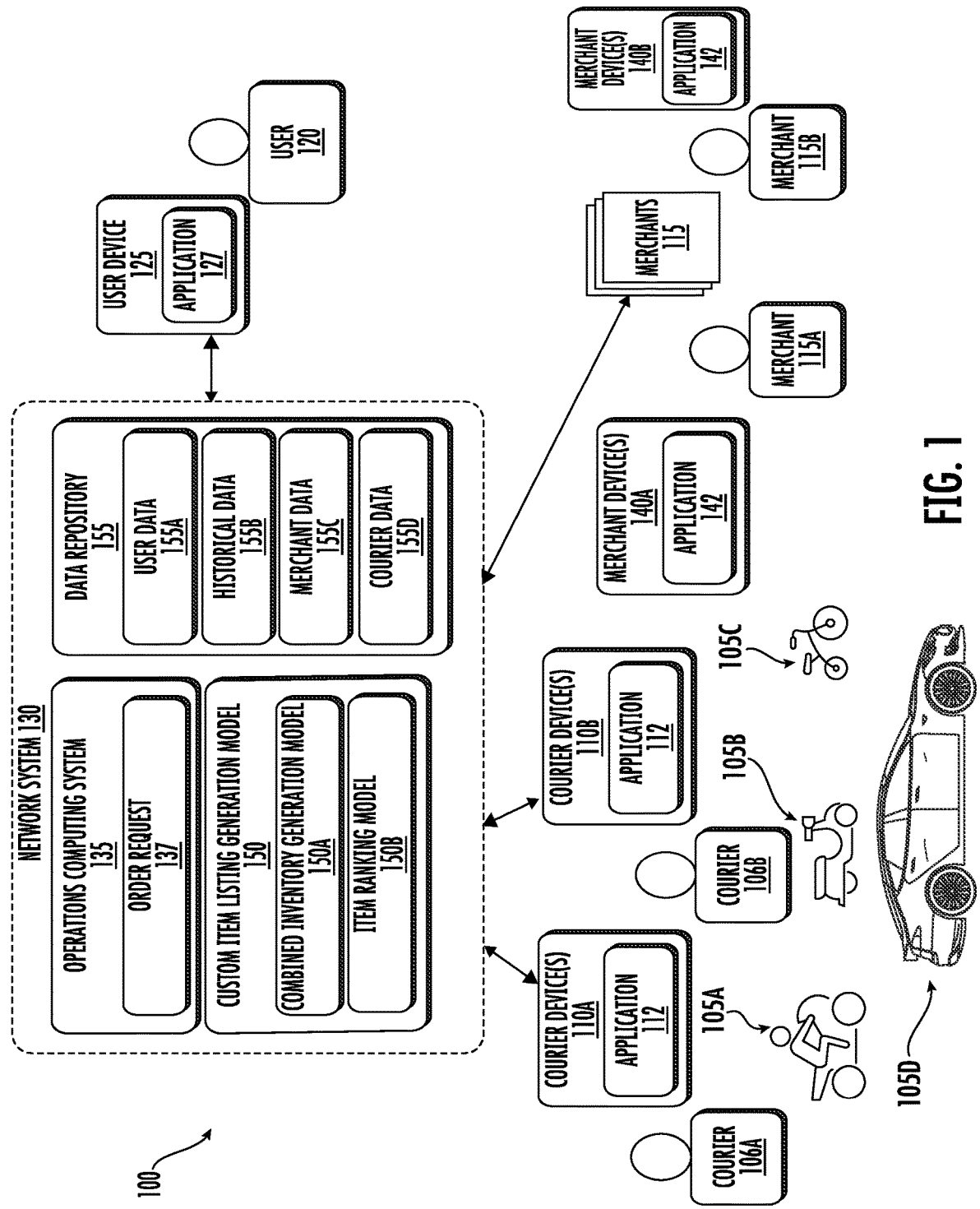
FIG. 1 depicts a block diagram of an example system for strategic routing and distribution of orders for multi-location merchants.

Generally, the present disclosure is directed to improved systems and methods for strategic routing and distribution of orders for multi-location merchants. More particularly, aspects of the present disclosure relate to coordinating delivery of multiple items based on store inventory and courier availability. For instance, a merchant can have multiple brick and mortar locations in a given geographic area. The inventory of the brick-and-mortar locations can vary. Traditionally, delivery services treat individual brick-and-mortar locations of the same merchant as distinct vendors (e.g., within a service application). In some instances, overall system resources can allow for a delivery service to be performed by multiple couriers coordinating order fulfillment from multiple locations associated with the same merchant. The present disclosure provides for a multi-courier order delivery service to facilitate fulfillment of a service request by coordinating multiple couriers obtaining items from multiple brick-and-mortar locations.

For example, the computing system can receive a service request which can include a plurality of items to be delivered to a destination location. For instance, a user can place an order for groceries including milk and eggs to be delivered. The computing system can determine that a first item is available at the first grocery location and unavailable at a second grocery location and that a second item available at the second grocery location and unavailable at the first grocery location. For instance, a store located on ABC Avenue can have milk in stock and be out of eggs and a store located on XYZ Avenue can have eggs in stock and be out of milk.

In some embodiments, the computing system can facilitate a first courier obtaining the first item (e.g., milk) located at the first grocery location and dropping the first item (e.g., milk) off at a second grocery location. The computing system can determine an estimated time for a second courier to travel from a current location to the second grocery location, obtain the eggs, and return to their vehicle to transport the items to the destination location. The computing system can determine a trigger time indicative of when the second service assignment needs to be transmitted to the second courier based on a progress of the first service assignment to avoid inefficient use of system resources (e.g., transmission of communications over a network due to communications about waiting for an order, idle time of a courier).

The computing system can determine the progress of the first courier on obtaining the first item (e.g., milk). Based on a comparison of the progress of the first courier with the trigger time, the computing system can automatically trigger transmission of the second assignment to the second courier. This can allow for coordinating the service assignments being transmitted to the couriers to avoid wait time for the second courier between the time of completion of obtaining the second item (e.g., eggs) and completing the assignment by traveling to the destination location and dropping off the items.

In some embodiments, the present disclosure can provide for a service provider computing system that monitors courier availability to fulfill requests, inventory for grocery locations, estimated order fulfillment times, estimated demand, merchant locations, or user locations. Based on overall system resources, the computing system can provide a listing of item offerings to a user (e.g., displayed via a user interface of a client device). For instance, the computing system can determine that there are adequate system resources to facilitate a multi-courier order delivery (e.g., the number of available couriers is above a threshold). In some implementations, the adequacy of system resources can be determined based on a comparison of a plurality of merchant locations (e.g., grocery locations). For instance, real-time data associated with traffic, weather, courier supply, and the like can be used to determine a distance or time between a first grocery location and a second grocery location. The distance or time between the first grocery location and second grocery location can be compared to a threshold distance or time.

In some implementations, the first grocery location and second grocery location can be 20 miles away from one another, multi-courier order delivery may be unavailable (and thus a combined inventory would not be generated by the computing system). In some implementations, the first grocery location and second grocery location can be located within a threshold distance from each other. The distance can be a haversine distance, travel distance, estimated time of transit. The distance can be determined in real-time (or near real-time) based on data such as, for example, weather or traffic.

The threshold distance or time can be a static distance or time (e.g., set to a specific number of miles or minutes). Additionally or alternatively, the threshold distance or time can be dynamic. For example, the threshold distance or time between the first grocery location and the second grocery location can change based on time of day, courier availability, traffic, user location, or other factors.

By way of example, the listing of item offerings can be determined based on the courier availability, inventory for the grocery locations, historical user data associated with preference, location of a user, or location of respective grocery locations. The computing system can maintain an inventory for each respective grocery location and can generate custom item offerings for users that combine offerings from multiple brick-and-mortar locations associated with a particular brand.

In some implementations, the computing system can determine that there are inadequate system resources to facilitate a multi-courier order delivery (e.g., the number of available couriers is below a threshold). In these instances, the customer offerings for the user can be adjusted to show offerings for a single brick-and-mortar location associated with a particular brand. For example, instead of a single listing of items associated with Brand W Grocery, there can be a listing of items associated with Brand W Grocery's location on ABC Avenue and a second listing of items associated with Brand W Grocery's location on XYZ Avenue. The computing system can determine which store to display the inventory of based on courier supply, geographic location of the destination location, geographic location of the grocery location, or historical user preference. For instance, if a user normally orders diet soda and Brand W Grocery's ABC Avenue location is out of diet soda and the XYZ Avenue location has diet soda in stock, the computing system can choose to display the listing of items (e.g., associated with the inventory of) Brand W Grocery's XYZ Avenue Location.

The technology of the present disclosure can provide a number of technical effects and benefits. For instance, aspects of the described technology can allow for combining inventory of a plurality of merchant locations on the server side so that the transmission of duplicative data (e.g., item offerings) can be avoided when providing a customized ranking of items to be displayed to a user. Computing resource utilization can be decreased by reducing a number of service requests or user input that would be processed if a user was manually generating orders for multiple brick-and-mortar locations associated with a single grocery brand. Additionally, the present disclosure provides for more efficient routing and distribution of orders from multiple locations. The present system and methods provide for proactively avoiding instances of redundant transmission of data between courier and user devices due to communications relating to out-of-stock items. Reducing the amount of data processed by the computing devices due to decreased user input obtained by interacting with an application via a user interface.

FIG. 1 depicts a block diagram of an example system 100 for strategic routing and distribution of orders for multi-location merchants. As illustrated in FIG. 1, system 100 can include one or more vehicles 105A-D (e.g., a car, scooter, motorcycle, bicycle) and one or more courier devices 110 that can be associated with one or more couriers 106A-B. In some examples, the one or more couriers are humans (e.g., that can operate a vehicle). In some examples, the courier can be non-human (e.g., vehicle, autonomous vehicle, autonomous robot). The one or more couriers 106A-B and the one or more courier devices 110A-B (e.g., an onboard tablet, a mobile device of a courier) can be associated with the one or more vehicles 105A-D. The courier devices 110A-B can include application 112 associated with the grocery delivery service entity, which can run on the courier devices 110A-B.

The computing system 100 can include one or more merchants 115. The computing system can include a first merchant 115A and a second merchant 115B. The network system 130 can obtain and store data from merchants 115. For instance, data can be stored in data repository 155. Data repository 155 can include user data 155A associated with one or more users, historical data 155B, merchant data 155C, and courier data 155D. User data 155A can include data associated with one or more users (e.g., user 120). Historical data 155B can include data associated with prior use of services of a user, preference of a user, courier data, historic packing time, and the like. Merchant data 155C can include data associated with a merchant such as merchant inventory, merchant location, merchant item preparation time, merchant time to pack time, and the like. The inventory data associated with merchants 115 can be used to determine what item offerings to present to user 120 via user device 125 (e.g., via software application such as application 127). The manner in which the item offerings are presented to user 120 will be discussed in greater detail herein (e.g., with respect to custom item list generation model 150, FIG. 2). Courier data 155D can include data associated with one or more couriers (e.g., courier 106A, courier 106B) such as a list of couriers that are online, a status, a location, a vehicle capacity, a vehicle type, or courier preferences. A status of a courier can include that the courier is currently providing a service, is available to provide a new service, etc. A location can include a past location, current location, future location, etc. Courier preferences can include types of services, types of routes, location of the service, etc.

The merchants 115 (or courier 106A and courier 106B) can receive data indicative of a grocery delivery service request from a user 120. For example, the user 120 can submit a request through a user device 125 associated with the user (e.g., via a software application such as application 127). A network system 130 can include a computing system associated with a service entity that can facilitate a request for services from user 120. An operations computing system 135 associated with the grocery delivery service entity can facilitate a request for services from user 120. For example, user 120 can submit a grocery delivery service request through a user device 125 associated with the user 120 (e.g., via a software application such as application 127). Operations computing system 135 can receive a grocery delivery service request for an order request 137 from a user device 125. For instance, the request can include a first item that is in stock with merchant 115A and not in stock with merchant 115B as well as a second item that is not in stock with merchant 115A and is in stock with merchant 115B. The operations computing system 135 can transmit data indicative of order request 137 to a merchant device 140A associated with a merchant 115A or merchant device 140B associated with merchant 115B (e.g., via a software application such as application 142). For instance, the operations computing system 135 can transmit data indicative of a first portion of order request 137 associated with the first item to merchant 115A and data indicative of a second portion of order request 137 associated with the second item to merchant 115B.

The operations computing system 135 can receive data indicative of merchant 115A and merchant 115B accepting an order request (e.g., grocery items being packed, estimated time to pack grocery items, food being prepared, estimated preparation time). The operations computing system 135 can send a request to a courier device 110A associated with a courier 106A or a courier device 110B associated with courier 106B to complete a portion of the order request 137 (e.g., via a software application such as application 112). For instance, the operations computing system 135 can transmit data indicative of a first portion of order request 137 (e.g., a first service assignment) to courier device 110A associated with courier 106A and data indicative of a second portion of order request 137 (e.g., a second service assignment) to courier device 110B associated with courier 106B.

Additionally, or alternatively, the operations computing system 135 can receive data indicative of courier 106A and courier 106B accepting an order request (e.g., grocery items being packed, estimated time to pack grocery items, food being prepared, estimated preparation time). The operations computing system 135 can send a request to a courier device 110A associated with a courier 106A or courier device 110B associated with courier 106B to complete a portion of the order request 137 (e.g., via a software application such as application 112). For instance, the operations computing system 135 can transmit data indicative of a first portion of the order request 137 (e.g., a first service assignment) to courier device 110A associated with courier 106A and data indicative of second portion of the order request 137 (e.g., a second service assignment) to courier device 110B associated with courier 106B. In some implementations, the first portion of the order request 137 can include one or more items for courier 106A to retrieve from a first physical location associated with a merchant. In some implementations, the second portion of the order request 137 can include one or more items for courier 106B to retrieve from a second physical location associated with a merchant.

The network system 130 can include custom item list generation model 150. Custom item list generation model 150 can include combined inventory generation model 150A and item ranking model 150B. Custom item list generation model 150 can generate data indicative of custom listing of items to transmit to user device 125. For instance, combined inventory generation model 150A can generate a combined inventory including items in stock with merchant 115A and items in stock with merchant 115B. Item ranking model 150B can rank a number of candidate items. Network system 130 can transmit data indicative of ranked items for display via user device 125 (e.g., via a software application such as application 127).

The network system 130 can include a data repository 155. Data repository 155 can include user data 155A (e.g., data associated with user 120), historical data 155B (e.g., data associated with user 120, data associated with merchant(s) 115, data associated with courier 106A and courier 106B), merchant data 155C (e.g., real-time data associated with merchants 115, merchant inventory associated with merchants 115, merchant location information associated with merchants 115), courier data 155D (e.g., data associated with courier 106A or courier 106B), or any other relevant data (e.g., system-level data associated with a plurality of users, expected demand).

Custom item list generation model 150 can generate a custom listing of items using combined inventory generation model 150A and item ranking model 150B. For example, the operations computing system 135 can obtain data indicative of a merchant location (e.g., associated with merchant 115A and merchant 115B), merchant inventory (e.g., associated with merchant 115A and merchant 115B), courier supply (e.g., number of available couriers within a geographic location to complete order requests), historic data (e.g., historical data 155B). In response to obtaining data indicative of a merchant location, merchant inventory, courier supply, or historic data, the custom item listing generation model 150 can generate a custom list of items to surface to a user (e.g., user 120 via application 127 via user device 125). Combined inventory generation model 150A can generate a combined inventory for one or more merchants 115.

The custom item list generation model 150, combined inventory generation model 150A, or item ranking model 150B can use data from the data repository 155 to surface one or more ranked items for display on a user device 125 (e.g., via a software application such as application 127). The operations computing system 135 can receive data indicative of order request 137 from a user device 125 (e.g., via a software application such as application 127) for an order. The operations computing system 135 can generate or retrieve item listings associated with inventory of one or more merchants 115. Operations computing system 135 can determine a level of courier supply (e.g., indicative of the number of available couriers within a geographical area). The operations computing system 135 can determine if the courier supply is above or below a threshold courier supply. If the courier supply is above a threshold courier supply, operations computing system 135 can initiate generation of a combined inventory generation (e.g., by combined inventory generation model 150A). If the courier supply is below a threshold courier supply, operations computing system 135 can determine not to generate a combined inventory for a plurality of merchants (e.g., because there are not enough couriers to facilitate a multi-courier order delivery for items that may be out of stock at one merchant while in stock at another merchant. Item ranking model 150B can rank the plurality of respective items based on user data 155A (e.g., indicative of user preferences), merchant data 155C (e.g., indicative of merchant location, merchant inventory), and courier data 155D (e.g., indicative of courier location, courier availability).

The operations computing system 135 can generate data indicative of the order request 137. This data can be indicative of an estimated time of departure, estimated time of arrival, estimated time to pack, estimated preparation time, real-time updates on order preparation, real-time updates on order packing, real-time updates on order location, real-time updates on courier location, or other information. The operations computing system 135 can provide data for display on a user device 125 (e.g., via application 127) indicative of updates on the order request 137. For example, an update can include an update about what stage of delivery the order is in (e.g., preparation, pick-up by first courier, first courier in route to second grocery location, first courier dropped off first item at second grocery location, second courier in route to second grocery location, second courier in route to destination location, second courier approaching destination location, order delivered).

The operations computing system 135 can send a request to a courier device 110A associated with a courier 106A (e.g., via a software application such as application 112) for courier 106A to perform a first portion of the order request service (e.g., first service assignment). The operations computing system 135 can send a request to a courier device 110B associated with a courier 106B (e.g., via a software application such as application 112) for courier 106B to perform a second portion of the order request service (e.g., a second service assignment). Courier 106A and courier 106B can be associated with a vehicle (e.g., vehicle 105A-D).

The operations computing system 135 can communicate data indicative of the grocery delivery service assignment to a courier (e.g., a human courier, an autonomous vehicle courier, an autonomous robot courier). For instance, the operations computing system 135 can send a request to the courier device 110A of courier 106A or courier device 110B of courier 106B. The request (e.g., for the courier to accept the grocery delivery service assignment) can be communicated to courier 106A or courier 106B via the application 112 running on courier device 110A or courier device 110B associated with the respective courier. Additionally or alternatively, operations computing system 135 can send a request to a courier device (e.g., a tablet stored onboard the vehicle) of at least one of vehicles 105A-D. Courier 106A or courier 106B can provide user input to courier device 110A or courier device 110B (e.g., via the application 112) to accept or decline the grocery delivery service assignment. In some examples, user input can be provided directly into application 112. Additionally or alternatively, user input can be provided via an application programing interface (API) or a third-party application. Data indicative of the acceptance or rejection of the request can be provided to operations computing system 135.

As described herein, system 100 can include a data repository 155. An example of data that can be stored in or associated with data repository 155 is described with regard to FIG. 2. FIG. 2 depicts example data stored in computing device memory 200. Example data can include request identifier 205, user preferences 210, candidate couriers 215, drop-off location 220, or merchant data 225. Merchant data 225 can include data associated with merchant A 230 and data associated with merchant B 260.

Request identifier 205 can be a request identifier associated with the grocery delivery service request. Request identifier 205 can be associated with order request data. Order request data can include a plurality of items in an order. For instance, the computing system can obtain data indicative of a service request including a request for at least a first item (e.g., item identifier milk) and a second item (e.g., item identifier eggs) to be transported to a destination location (e.g., drop-off location 220).

User preferences 210 can include preferences associated with the user indicative of preferences on brands, cuisine, time of orders, quantity of orders, or any other data associated with a user preference. The user preference 210 can be accessed based on metadata included in the service request such as an encrypted identifier associated with the user that allows the operations computing system 135 to access data for the particular user (e.g., from stored user profile).

Candidate couriers 215 can include data indicative of a plurality of candidate couriers available to facilitate completion of one or more current or future grocery delivery service requests. For instance, candidate couriers 215 can include data associated with a current number of active couriers within a geographic area. Candidate couriers 215 can include information about each respective courier. For instance, candidate couriers 215 can include data indicative of preferences of respective couriers, location of respective couriers, and the like. Drop-off location 220 can include data indicative of a destination location for the items associated with the grocery delivery service request to be dropped off by one or more couriers.

By way of example, a current number of active couriers within a geographic area can be compared to a threshold number of active couriers within a geographic area. For instance, a threshold number of active couriers can be indicative of a number of couriers being active in a geographic area to adequately perform a plurality of current or predicted future vehicle service requests. A number of active couriers that exceeds the threshold number of active couriers can be indicative of a surplus of available couriers to perform expected vehicle service requests within the geographic region. A number of active couriers that does not exceed the threshold number of active couriers can be indicative of an undersupply of active couriers in a geographic area to perform expected vehicle service requests within the geographic region.

The comparison of the current number of active couriers within a geographic area can be compared to the threshold number of active couriers to determine whether to offer a user (e.g., user 120) a combined inventory or separate inventory for a plurality of merchants (e.g., merchants 115). For example, whether to provide for display a combined listing of items available at merchant A 230 and merchant B 260 or to provide for display two distinct listings: a listing of items available at merchant A 230 and a separate listing of items available at merchant B 260. Additionally or alternatively, the comparison can be used to initiate a search of the inventory of a nearby store to determine whether to consider combining the inventory of the nearby store with the inventory of a second store location.

In some implementations, the comparison of the current number of active couriers to the threshold can include consideration of the heading of each respective courier (e.g., where the courier is going). For instance, if a courier is far from a home location and close to a time where the courier normally stops performing delivery services, the courier can be considered active or available for a leg of a multi-courier order request fulfillment that takes the courier closer to the courier's home location. Additionally or alternatively, if a courier is currently fulfilling an order and can add a leg of a multi-courier order request fulfillment in conjunction with the courier's current order fulfillment, the computing system can send a request to the courier to fulfill multiple requests simultaneously.

For example, a heading of a respective courier can be determined using data indicative of courier location or courier online pattern. For instance, a courier location can be determined using GPS pings, Wi-Fi, IP address, device sensor data, cellular network, or user input. A courier online pattern can include a past history associated with a courier. For instance, past history associated with a courier can include prior service completion history, prior service request denial history, or prior travel patterns, prior online hours history (e.g., times of day a courier is accepting service requests).

The courier's heading or online pattern can be used to forecast a courier's availability for a leg of the combined service. For instance, in the event that the computing system determines that the heading of the courier is pointed in a direction away from a merchant location associated with a service request and travelling away from the merchant location, the computing system may determine that the courier is not available for the combined service. Additionally, or alternatively, the computing system may forecast that a courier may not be available for a particular service request in the event the courier's online pattern indicates that the courier typically declines such type of service, is likely to go offline soon, etc.

Merchant data 225 can include data associated with a plurality of merchants (e.g., merchants 115). For instance, merchant data 225 can include data associated with merchant A 230 and data associated with merchant B 260. The data associated with merchant A 230 can include a location 235 of merchant A 230, inventory 240 of items offered by merchant A 230, hours 245 of merchant A 230, an estimated time to pack 250 items at merchant A 230, or other information. Data associated with merchant B 260 can include a location 265 of merchant B 260, inventory 270 of items offered by merchant B 260, hours 275 of merchant B 260, an estimated time to pack 280 items at merchant B 260, or other information. Location 235 and location 265 can include data indicative of a location of the merchant (e.g., geographic location, GPS coordinates, latitude and longitude). Inventory 240 and inventory 270 can include a listing of item identifiers and the quantity of items (e.g., as depicted in 240A-D and 270A-D). Estimated time to pack 250 and 280 can include an average time it takes to pack the item (e.g., for a merchant or courier to obtain the item and check out at a store). Time to pack 250 and 280 can include a time to physically find an item or can include time to prepare an item (e.g., cooking time, preparation time). Estimated time to pack 250 and 280 can vary for item identifiers based on merchant. For instance merchant A 230 can be associated with time to pack 250A-250D and merchant B 260 can be associated with time to pack 280A-280D. For instance, in some merchant locations, produce may be located right near the entrance, whereas in alternative merchant locations, produce is located in the back of the store. Thus, the estimated time to pack 250 and 280 can be indicative of an average time to pack determined by the computing system (e.g., system 100, network system 130, or operations computing system 135).

In some implementations, merchant A 230 and merchant B 260 can have overlapping inventory. For instance, as depicted in FIG. 2, merchant A and B both have inventory of item identifiers apple (e.g., inventory 240A and inventory 270A), orange (e.g., inventory 240B and inventory 270B). Merchant A has zero inventory of item identifier eggs (e.g., inventory 270D) and merchant B 260 has no inventory of item identifier diet soda (e.g., inventory 240C) or item identifier milk (e.g., inventory 270C). In an example, the computing system can determine that a first item (e.g., item identifier diet soda based on inventory 240C or item identifier milk based on inventory 240D) is available at a first grocery location (e.g., merchant A 230) and unavailable at a second grocery location (e.g., merchant B 260) and that a second item (e.g., item identifier eggs based on inventory 270D) is available at a second grocery location (e.g., merchant B 260) and unavailable at the first grocery location (e.g., merchant A 230).

In some embodiments, first grocery location (e.g., merchant A 230) and second grocery location (e.g., merchant B 260) can be associated with a single brand. For instance, merchant A 230 can be Grocery Store A's ABC Avenue location and merchant B 260 can be Grocery Store A's XYZ Avenue location. In some implementations, first grocery location (e.g., merchant A 230) and second grocery location (e.g., merchant B 260) can be associated with different brands. For instance, merchant A 230 can be Grocery Store W's ABC Avenue location and merchant B 260 can be Grocery Store V's ABC Avenue location.

In some implementations, the computing system can generate a combined inventory of the first grocery location (e.g., merchant A 230) and the second grocery location (e.g., merchant B 260). For instance, generate and provide for display a listing of items that includes the items of the first grocery location and second grocery location. Generating the combined inventory can be based on: (i) courier availability, (ii) the inventory for the first grocery location, (iii) the inventory for the second grocery location, (iv) historical user data, (v) user location (e.g., drop-off location, destination location, current user location), (vi) location of the first grocery location or (vii) location of the second grocery location. In some implementations, the generation of the combined listing of items can be based on the computing system determining that the number of active couriers is above a threshold number of active couriers.

In some embodiments, each user can be presented with a customized listing of items (e.g., that has been generated by the computing system) including a custom combined inventory based on merchant locations chosen based on the destination location (e.g., drop-off location 220). In some instances, users in similar geographical areas can be presented with a same or similar customized listing of items (e.g., that have been generated by the computing system) including a combined inventory based on merchant locations (e.g., location 235, location 265).

Items included in the inventories can include items of various categories. For example, categories of items can include produce, packaged items, meat, dairy, and the like. In some implementations, the determination of whether to generate a combined inventory can be based on the category of items. For instance, a user may not care whether a packaged non-perishable item comes from Grocery Store A or Grocery Store B. However, a user may have trust associated with produce from Grocery Store A that the user does not have with produce from Grocery Store B. Thus, fulfilling the order for the produce items from different stores would likely be unacceptable to the user. However, if the user would like a packaged branded beverage that is generally available at Grocery Store A merchant locations and Grocery Store B merchant locations, a user may not have a preference on where the item is obtained from.

In some embodiments, the computing system can forecast a user preference associated with one or more categories. For example, a user preference can be forecasted based on user order history. User order history can include prior orders placed by a user. Prior orders can include item, an item category, a store brand, etc. Based on a user's prior order request history, the computing system can determine stores or brands that are associated with a plurality of the user's prior order requests. By way of example, a user can regularly order bananas from grocery store A, regularly order packaged goods from grocery store B, and regularly order meat from grocery store C. Based on the user's history of ordering bananas from grocery store A, the computing system can predict that the user is more likely to want bananas (or other produce) from grocery store A than grocery store B or C. The computing system can determine that if a user is likely to want to place an order for bananas and meat, it would not be fruitful to offer a combined inventory for bananas and meat from grocery A because the user is unlikely to order bananas and meat from the same store.

In some implementations, user preferences can be stored in data repository 155 (e.g., historical data 155B). In some instances, user preferences can be determined based on receipt of user input indicative of one or more user preferences. For instance, a user interface comprising one or more selectable components can be provided for display via a user interface of user device (e.g., user device 125). For instance, the user interface can be provided for display via application 127. A user can provide input indicative of preferred store brands, preferred store locations, preferred items, or preferred item categories.

Based on the user preferences, the computing system can predict one or more suggested items, item categories, brands, or store locations. The computing system can generate one or more customized item listings based on the suggested items. In some instances, the customized item listings can include separate inventories. In some instances, the customized item listings can include combined inventories.

In some implementations a user (e.g., user 120) can be notified that one or more items in an item listing will be fulfilled from a second grocery location. For instance, an item listing can include an asterisk or some other identifying feature. By way of example, the identifying feature can include a selectable component that, upon user interaction (e.g., selection, click) can result in a notice being provided for display that includes language relating to "Produce item will be higher in price. Click here to learn more." A user can select "here" and a new window can populate with a message. The message can include, for example, "These produce items are higher in price because they are out of stock at merchant A location. They can be fulfilled at merchant B location for a price increase of X dollars." Thus, a user can be notified of a potential for increased cost. In some implementations the service provider entity or merchant may absorb a cost associated with a multi-courier order fulfillment.

A user (e.g., user 120) can select a first item and second item that require a multi-courier fulfillment. The computing system can determine a first courier and a second courier to fulfill a first portion of the grocery delivery service (e.g., first service assignment) and a second portion of the grocery delivery service (e.g., second service assignment). The fulfillment of the grocery delivery service can take place in a geographic area such as geographic area 300 that is described in FIG. 3-FIG. 10.

While the example embodiments described with reference to FIGS. 3-10 are described within the context of a grocery delivery service and grocery locations, this is not intended to be limiting. The systems, methods, and technology of the present disclosure can be used within the context of delivery services for other items and other types of merchants, other than groceries and grocery stores. This can include other retail items/goods.

Figure 3:
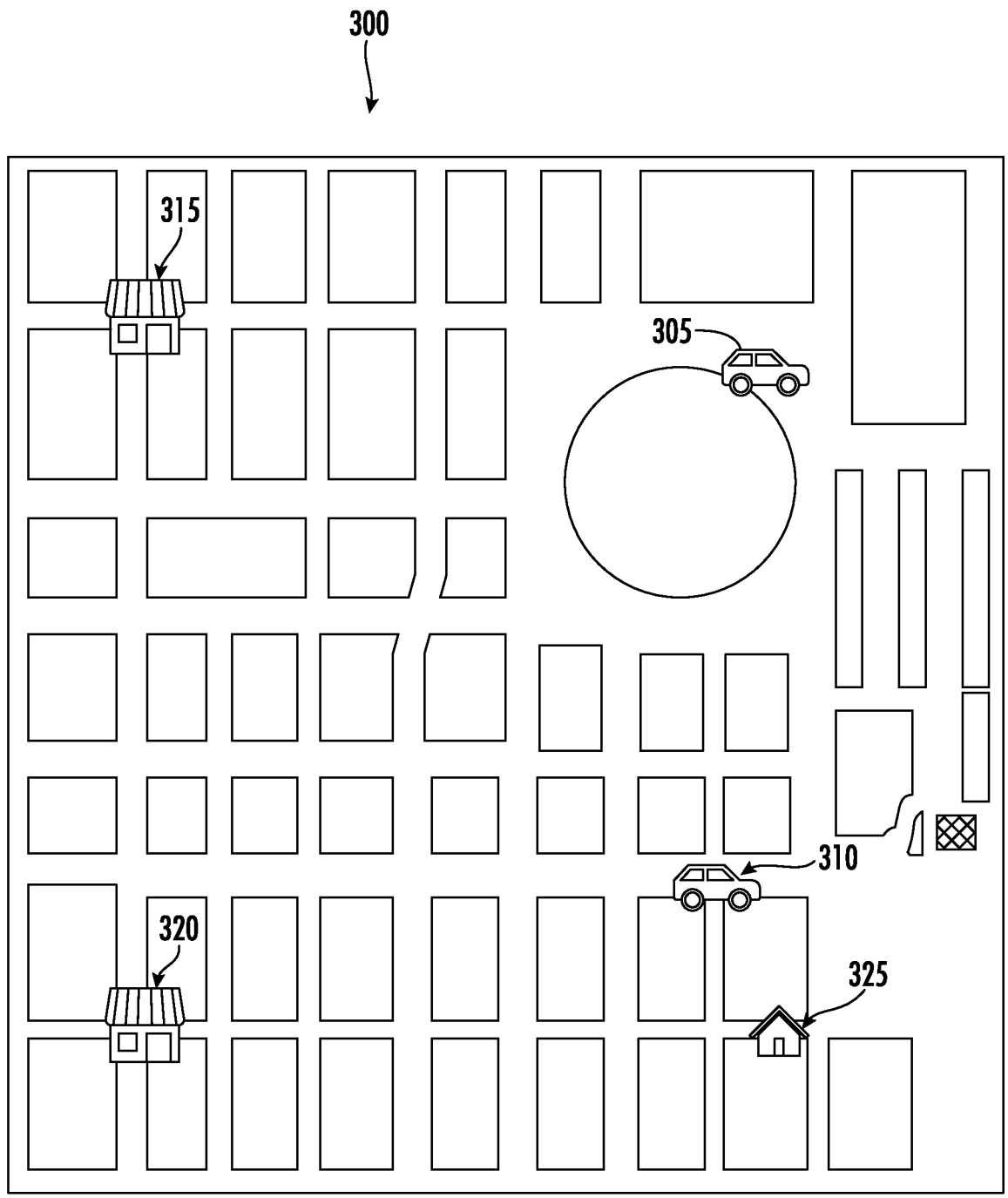
FIG. 3-FIG. 10 depict an example geographic area according to example embodiments of the present disclosure.

As depicted in FIG. 3, geographic area 300 can include a location associated with first courier 305, a location associated with second courier 310, a first grocery location 315, a second grocery location 320, and a destination location 325.

In some implementations, the computing system can determine a first courier 305 to pick up the first item at the first grocery location 315 and transport the first item from the first grocery location 315 to the second grocery location 320. Additionally or alternatively, the computing system can determine a second courier 310 to obtain the second item and the first item at the second grocery location 320.

Figure 4:
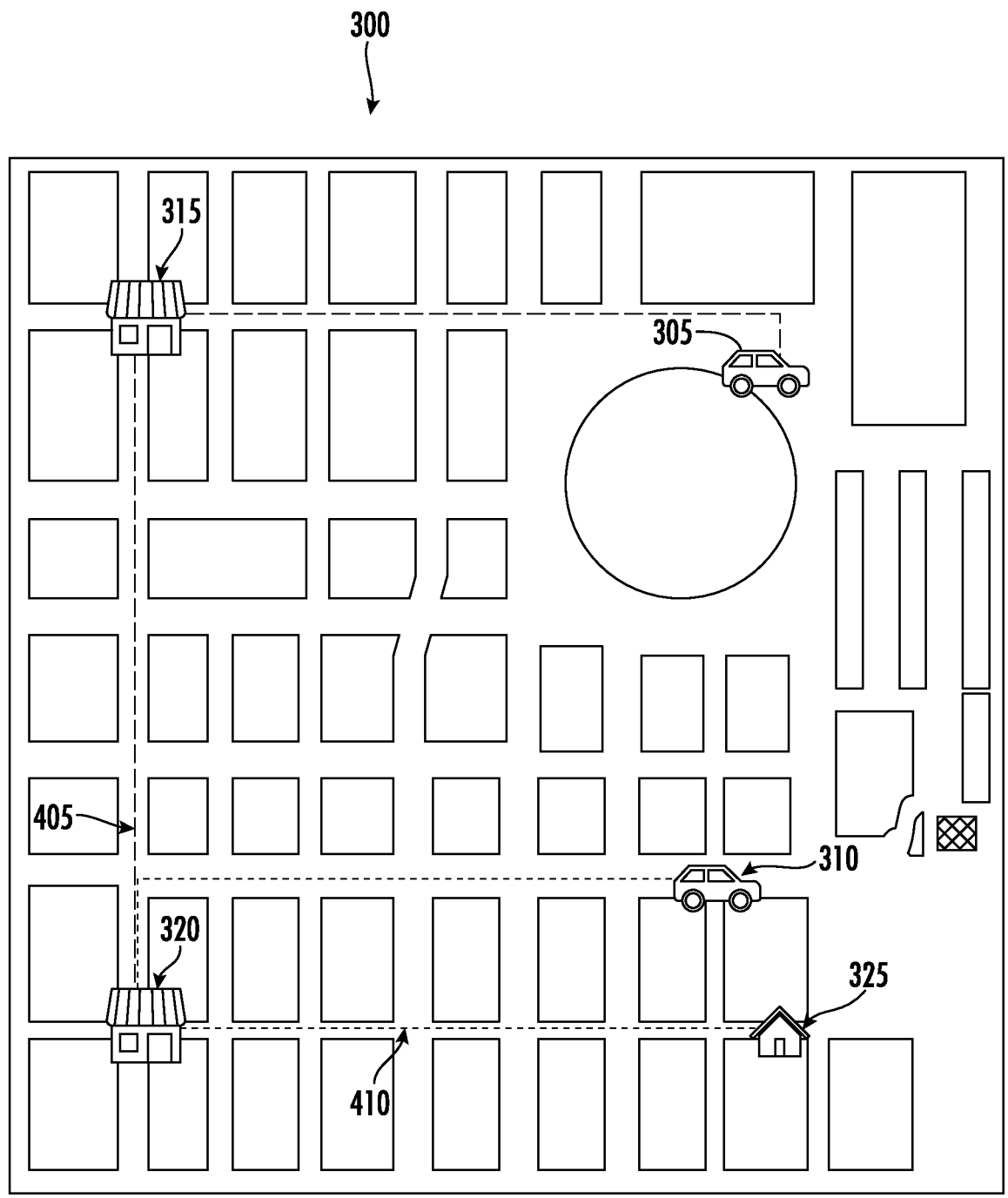

With reference to FIG. 4, the computing system can determine a route 405 for first courier 305 from a current location to first grocery location 315 and from first grocery location 315 to second grocery location 320 as depicted in FIG. 4. The computing system can determine a route 410 for second courier 310 from a current location to a second grocery location 320. The computing system can transmit first instructions to a first courier device associated with first courier 305. The first instructions can be executed by a first courier device (e.g., courier device 110A associated with courier 106A) to cause data associated with a first service assignment to be provided for display via a user interface of the first courier device (e.g., via application 112 via courier device 110A). The first service assignment can include a first portion of a service assignment associated with a grocery delivery service request. The first service assignment can indicate the first courier 305 is to transport the first item from first grocery location 315 to the second grocery location 320.

In some implementations, the first courier 305 to fulfill the first portion of the grocery delivery service and the second courier 310 to fulfill the second portion of the grocery delivery service can be determined concurrently (e.g., overlapping timeframes, simultaneously, nearly simultaneously).

In some implementations, the first courier 305 to fulfill the first portion of the grocery delivery service can be determined before the second courier 310 is determined to fulfill the second portion of the grocery delivery service. For instance, the second courier 310 can be chosen based on the progress of first courier 305 during the fulfillment of the first portion of the grocery delivery service.

Figure 5:
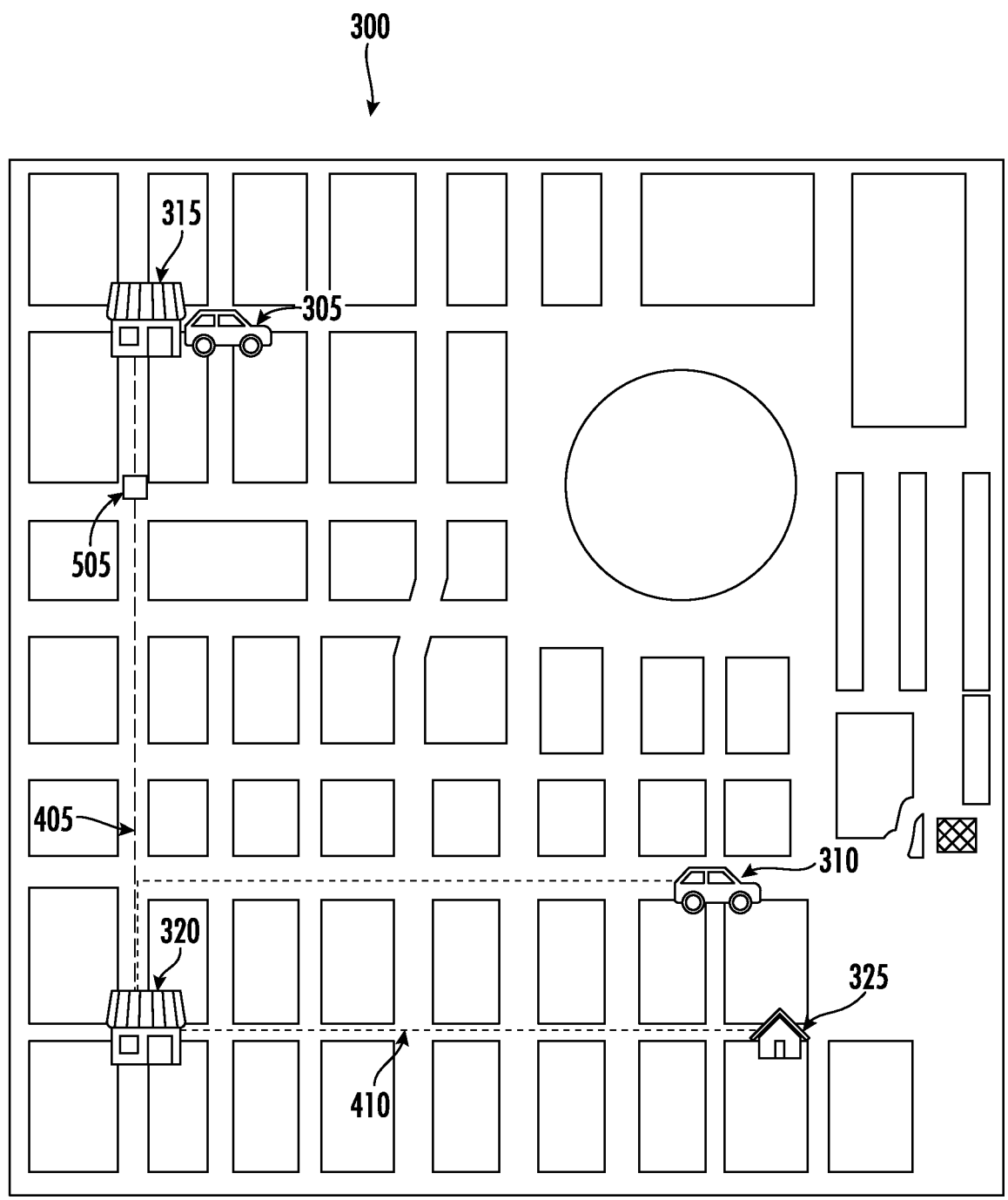

With reference to FIG. 5, in some embodiments, trigger time 505 can be determined based on a distance between first grocery location 315 and second grocery location 320. For instance, the distance between first grocery location 315 and second grocery location 320 can be represented in a plurality of forms including, a physical distance measurement (e.g., mile, kilometers, haversine distance, distance traveled) or a time measurement (e.g., seconds, minutes). The distance can be static (e.g., a haversine distance) or can be dynamic (e.g., distance traveled, time). A dynamic distance can take into account real-time conditions (or near-real-time conditions) that can include weather, traffic, or courier supply.

As depicted in FIG. 5, transmission of data indicative of the second portion of the grocery delivery service can be sent to second courier 310 based on trigger time 505. The computing system can generate trigger time 505. In some implementations, the computing system can determine an estimated time for second courier 310 to travel to second grocery location 320 and obtain the second item. The computing system can determine trigger time 505 based on the estimated time for second courier 310 to travel to the second grocery location 320 and obtain the second item.

For instance, determining trigger time 505 can be based on (i) an estimated time to pack one or more items at the second grocery location, (ii) a location of the second courier, (iii) a location of the first grocery location, or (iv) a location of the second grocery location. An estimated time to pack one or more items at the second grocery location can be determined based on a number of items in addition to the second item, the location of the one or more items within second grocery location 320, and historical data indicative of pack or preparation time associated with the respective items and the second courier 310. In some implementations, obtaining the items does not include packing by first courier 305 or second courier 310. For instance, a shopper associated with the first grocery location 315 or second grocery location 320 can pack the items. The first courier 305 or second courier 310 can pick up and transport the one or more items that have been collected by the shopper associated with the respective grocery location.

By way of example, a second courier can be located 5 minutes away from the second grocery location, an estimated time to travel from the second grocery location to the first grocery location can be 12 minutes, and an estimated time for the second courier to pack can be 15 minutes. The computing system can determine that the second courier will be ready to depart the second grocery location 20 minutes from the current time (e.g., a sum of 5 minutes travel time to the second grocery location plus 15 minutes estimated time to pack). The computing system can determine that the first courier is 20 minutes from dropping off the first portion of the order to the second grocery location. In response to determining that the first courier is 20 minutes from dropping off the first portion of the order to the second grocery location, the computing system can trigger a notification to be sent to a device associated with the second courier including the order request. Following this example, due to the 12-minute travel time from the first grocery location to the second grocery location, the trigger time can be determined to be a point at which the first courier is estimated to have 8 minutes remaining of time to pack (e.g., time to shop).

In some implementations, a time to pack or preparation time at the second location can be greater than the time to pack or preparation time at the first location. In some implementations, the pack or preparation time at the second location can be less than the pack or preparation time at the first location.

In some implementations, trigger time 505 can be a time after first courier 305 has departed first grocery location 315 and before arriving to second grocery location 320. For instance, the computing system can determine that the second courier is 5 minutes away from the second grocery location 320 and that the time to pack for the second courier is 5 minutes. The computing system can determine that the first grocery location 315 is 15 minutes away from the second grocery location 320. In order to prevent wait time for the second courier at the second grocery location 320, the computing system can determine the trigger time 505 should be after first courier 305 has departed first grocery location 315 and when first courier 305 is 10 minutes away from second grocery location 320.

In some implementations, trigger time 505 can be the time that the first instructions are transmitted to the first courier device such that the second instructions are sent concurrently to the first instructions. For example, the first instructions can be transmitted to the first courier device at the same time (or within a similar time range e.g., <30 s) the second instructions are sent to the second courier device. By way of example, the first courier can be located 3 minutes away from the first grocery location 315, the estimated time to pack for the first courier can be 10 minutes, and the estimated time to travel from the first grocery location 315 to the second grocery location can be 7 minutes. Thus, the first courier's time to complete the first portion of the order request can be 20 minutes. The second courier can be located 12 minutes away from the second grocery location 320 and the estimated time to pack for the second courier can be 8 minutes. Thus, the second courier's time to complete the second portion of the order request can also be 20 minutes. Based on the similarity in completion time of the first courier and the second courier, the computing system can determine that the trigger time is indicative of the second instructions being sent concurrently to the first instructions.

In some implementations, trigger time 505 can be associated with a geographic location along an expected route. For instance, the geographic location can be a predetermined distance from second grocery location 320 (e.g., associated with a certain estimated travel time from the location associated with trigger time 505 and the second grocery location 320). By way of example, the computing system can determine a geographic location based on an expected travel time from the geographic location to the second grocery location 320. The expected route can be associated with a first courier or a second courier. The computing system can determine that the first courier has triggered the trigger time 505 (e.g., geographic location along the expected route) based on a current location of the first courier along the expected route. For instance, a current location of the first courier can be determined based on tracking a device associated with first courier. For instance, current location can include data indicative of GPS pings, Wi-Fi, IP address, device sensor data, cellular network, or user input.

Figure 6A:
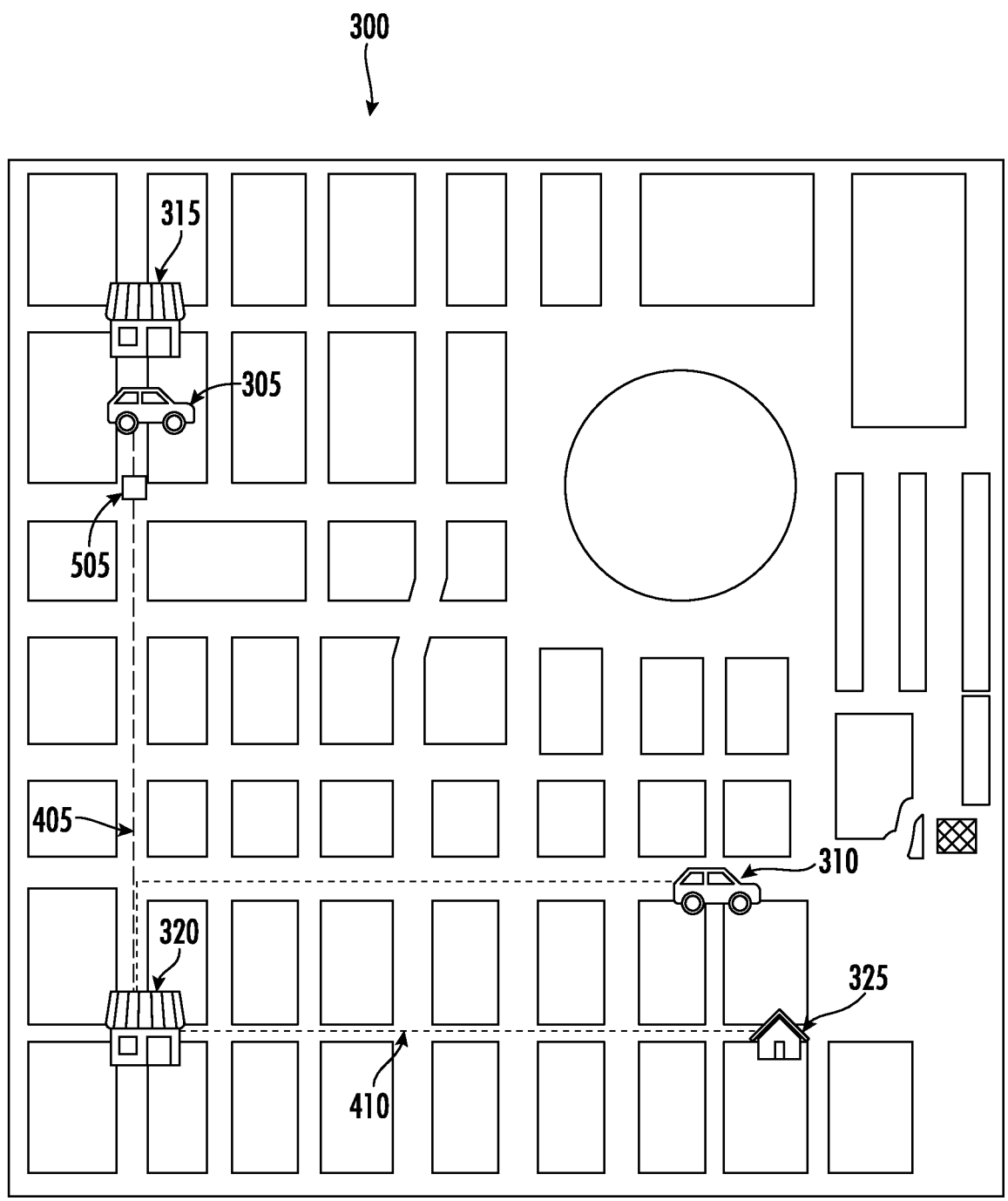

FIG. 6A depicts first courier 305 departing from first grocery location 315 after obtaining the first item. The computing system can obtain location data indicative of progress of first courier 305 along expected route 405 from a start location (e.g., as depicted in FIG. 3 and FIG. 4) to first grocery location 315 and from first grocery location 315 to second grocery location 320. For instance, location data can include data indicative of GPS pings, Wi-Fi, IP address, device sensor data, cellular network, user input, etc. transmitted over one or more communication networks. As depicted in FIG. 6, first courier 305 can depart first grocery location 315 and travel to second grocery location 320.

Figure 6B:
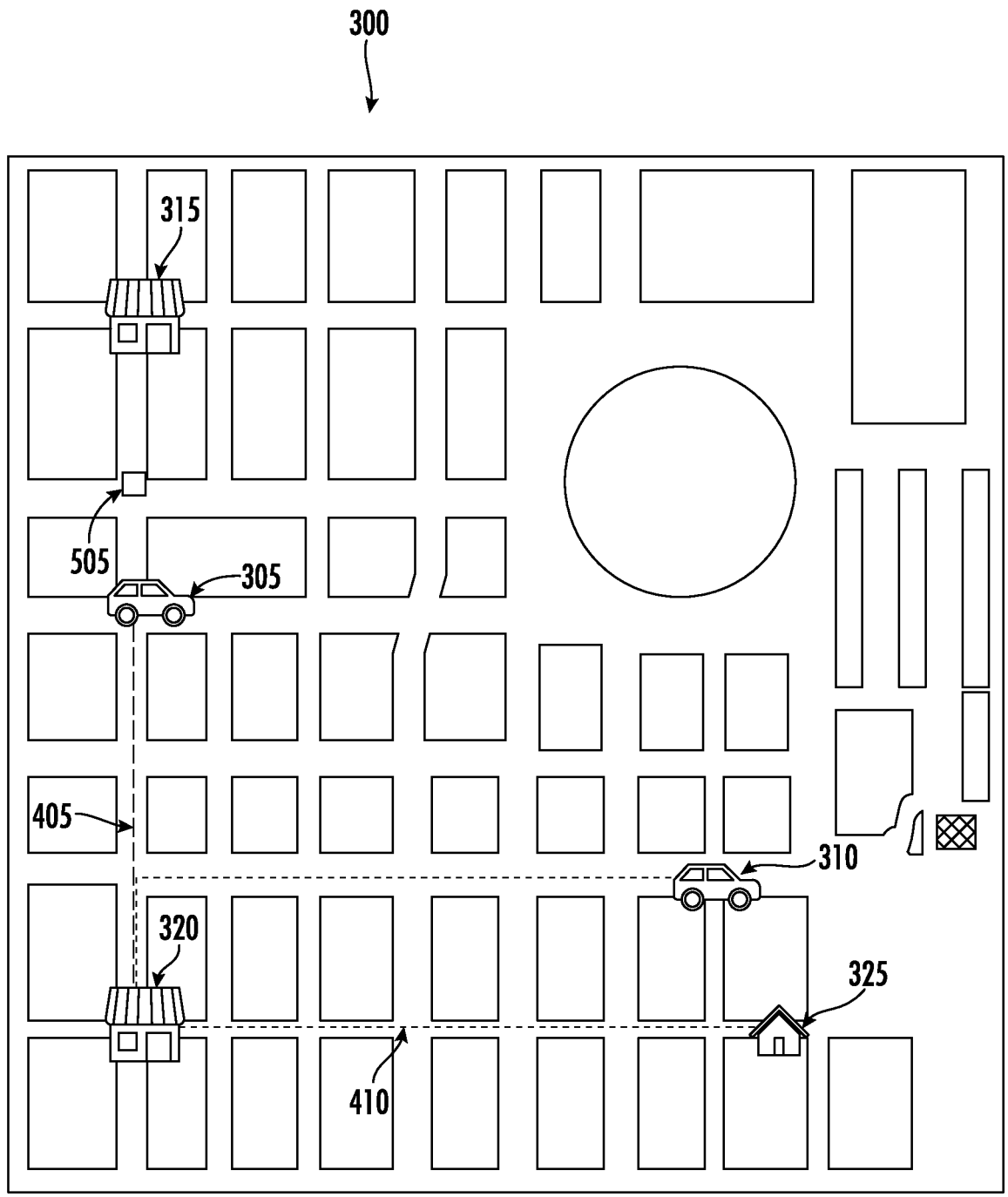

As depicted in FIG. 6B, the obtained location data can be compared to the expected route to determine that the first courier 305 has passed trigger time 505. Based on the progress of first courier 305 along expected route 405 and trigger time 505, the computing system can automatically trigger transmission of second instructions to a second courier device (e.g., courier device 110B associated with courier 106B) associated with second courier 310. The second instructions can be executed by the second courier device (e.g., courier device 110B) to cause a second service assignment to be provided for display via a user interface of the second courier device (e.g., via application 112 via courier device 110B). The second service assignment can include data indicative of a second portion of a service assignment associated with a grocery delivery service request. The second service assignment can indicate second courier 310 is to transport items to destination location 325.

Figure 7A:
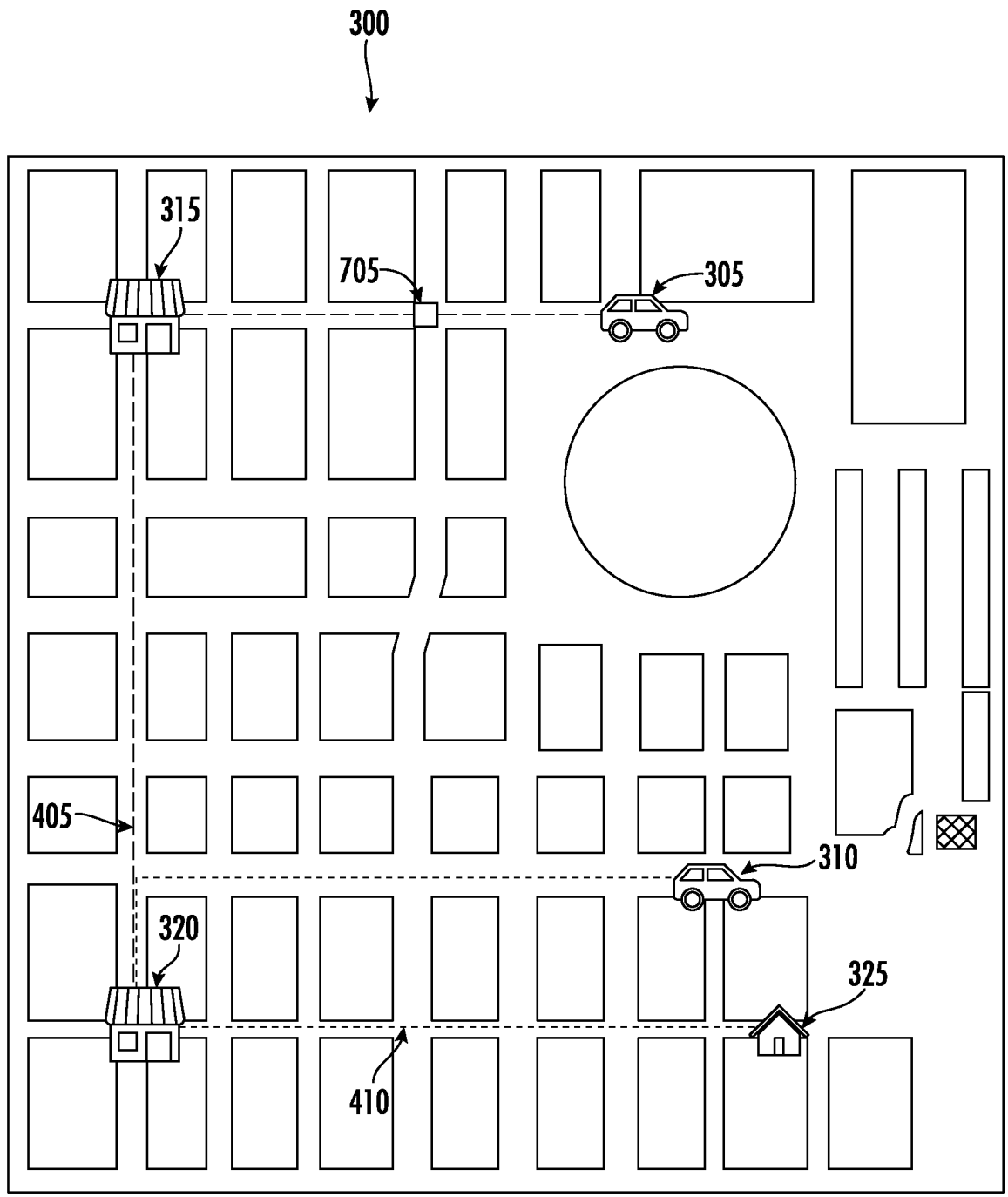

As depicted in FIG. 7A, a trigger time 705 associated with the second courier 310 can be triggered before the first courier 305 arrives at first grocery location 315. For instance, a trigger time 705 can be associated with a 2-minute estimated time of arrival to first grocery location 315, an estimated time to pack at first grocery location 315 can be 5 minutes, and an estimated travel time from first grocery location 315 to second grocery location 320 can be 7 minutes. Thus, an estimated time from trigger time 705 to second grocery location 320 for the first courier 305 can be 14 minutes. The estimated time from the location of the second courier 310 to second grocery location 320 can be 4 minutes and the estimated time to pack for second courier 310 can be 10 minutes. In order to align the completion time of first courier 305 with second courier 310, the computing system can determine that trigger time 705 should be before first courier 305 arrives at first grocery location 315.

As depicted in FIG. 7A, first courier 305 can approach trigger time 705. Trigger time 705 can be associated with triggering the sending of second instructions to a device associated with second courier 310 to complete a second portion of the service request.

Figure 7B:
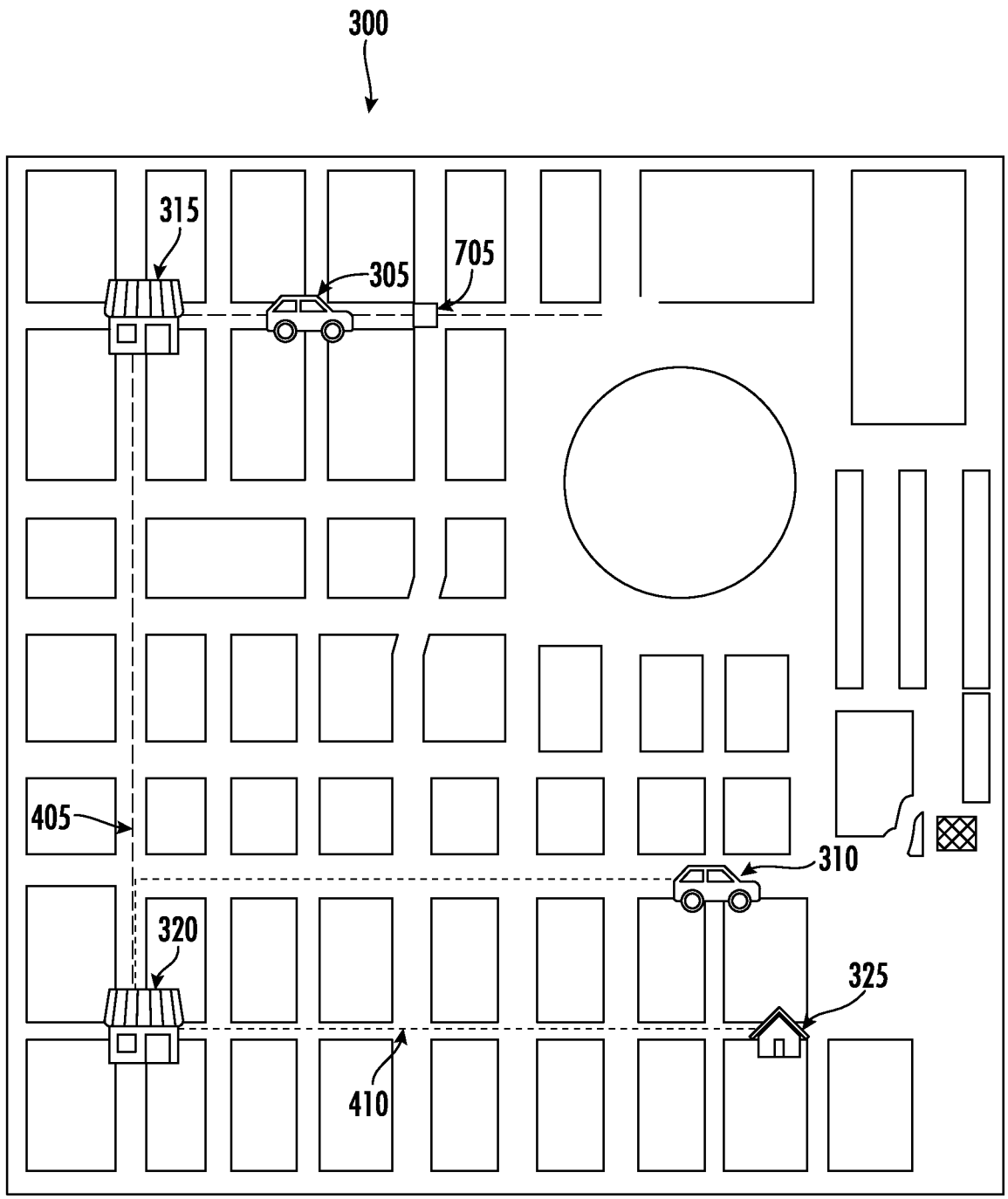

As depicted in FIG. 7B, the computing system can determine that first courier 305 has passed trigger time 705. For instance, the computing system can track the current location of first courier 305 (e.g., by obtaining location data including data indicative of GPS pings, Wi-Fi, IP address, device sensor data, cellular network, or user input). Based on tracking the current location of the first courier 305, the computing system can determine that the first courier 305 has passed trigger time 705. In response, the computing system can trigger the second instructions to be sent to a device associated with the second courier 310.

Data indicative of progress of the first service assignment and second service assignment can be provided to a user device (e.g., user device 125, courier device 110A, courier device 110B, merchant device 140A, merchant device 140B). For instance, data can include a pick-up location, pick-up instructions, item checklist, an indication that the order is a multi-courier order request requiring fulfillment from first grocery location 315 and second grocery location 320, estimated time of departure, estimated time of arrival, or estimated time to pack.

Figure 8:
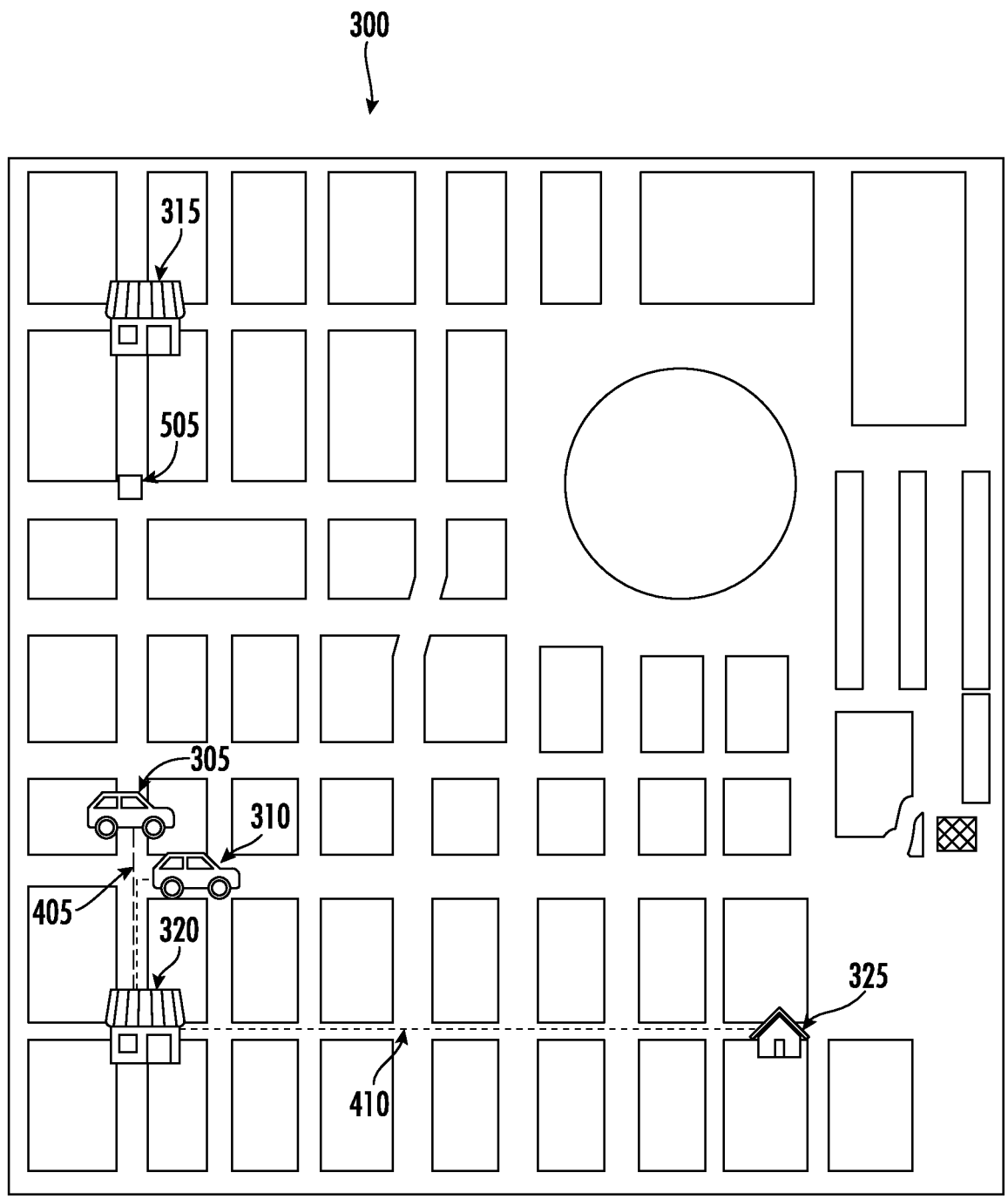

The computing system can obtain data (e.g., location data) indicative of the progress of first courier 305 on completion of the first service assignment and the progress of second courier 310 on completion of the second service assignment. As depicted in FIG. 8, first courier 305 can approach second grocery location 320 via route 405 and second courier 310 can approach second grocery location 320 via route 410.

In some implementations, first courier 305 can arrive at second grocery location 320 before second courier 310 arrives at second grocery location 320. In some implementations first courier 305 can arrive at second grocery location 320 after second courier 310 arrives at second grocery location 320. In some implementations, first courier 305 can arrive at second grocery location 320 at a similar time to second courier 310 (e.g., with 1-2 minutes). In some implementations, the first item can be directly handed from first courier 305 to second courier 310. In some implementations, the first item can be left in an item wait area of second grocery location 320.

Second grocery location 320 can include an item wait area. Item wait area can be a location in or near second grocery location 320 for first courier 305 to drop off items that were retrieved to complete the first portion of the order request (e.g., from first grocery location 315). Item wait area can be a secured area (e.g., guarded by an employee associated with second grocery location 320 or a compartment that can be physically locked or unlocked) or an unsecured area (e.g., a table or shelf that is accessible by second courier 310). A secured area can include an area that is accessible using a passcode, scanning of a QR code, proximity to a user device, or some other physical security measure. The area (and items stored within) can be obtained by second courier 310 through providing a passcode or other means of security or by the second courier 310 approaching an unsecured area to obtain the items associated with the first portion of the service request.

Figure 9:
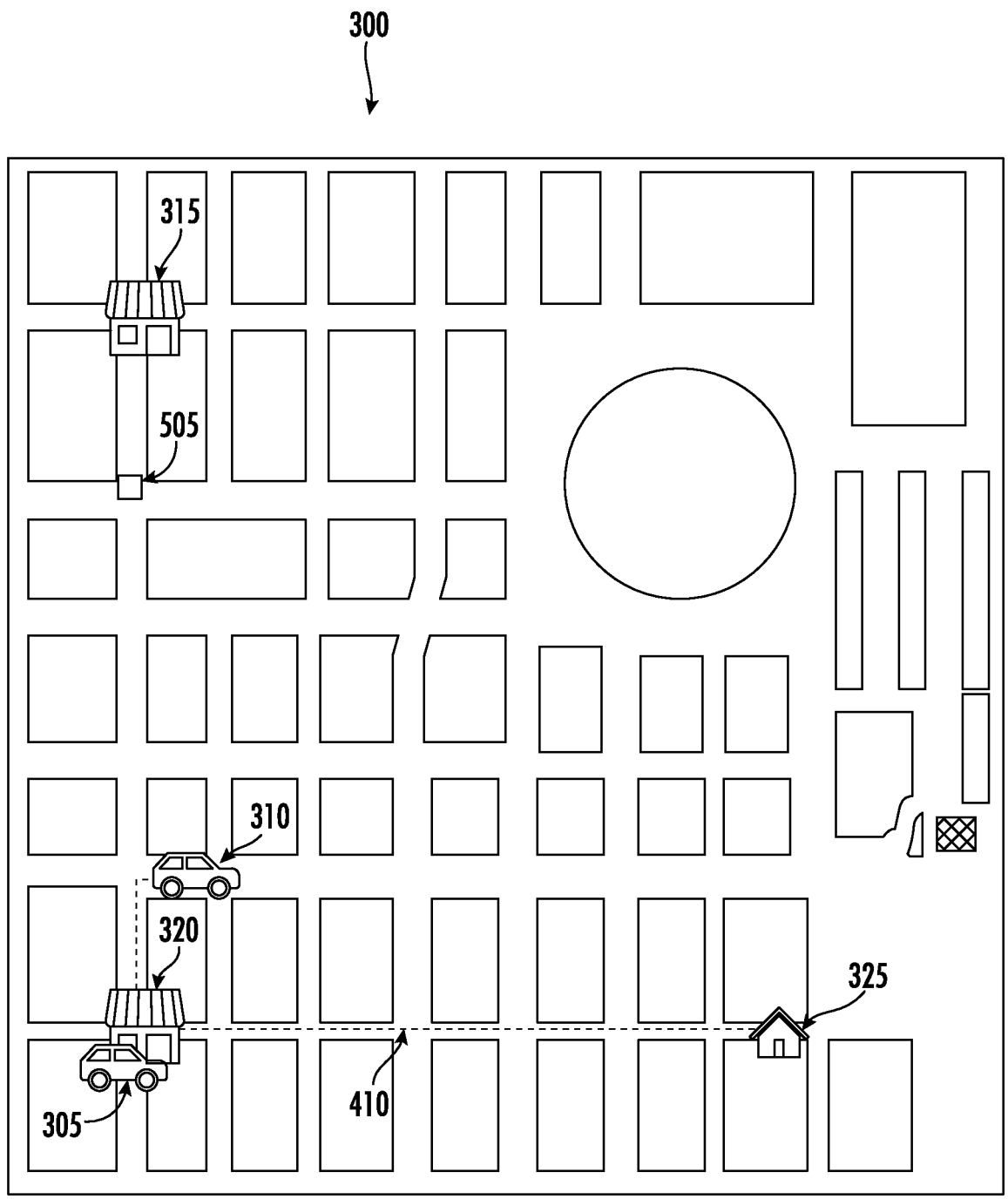

As depicted in FIG. 9, first courier 305 can arrive at second grocery location 320 and second courier 310 can continue progress on route 410 to second grocery location 320. After completion of the first service assignment, first courier 305 can depart for another service assignment, to search for another service assignment, or can go off-line (e.g., exit or close a software application such as application 112). In some implementations, first courier 305 can initiate another multi-courier service order request (e.g., to pick up one or more items at second grocery location 320 to take to first grocery location 315 or another location).

Figure 10:
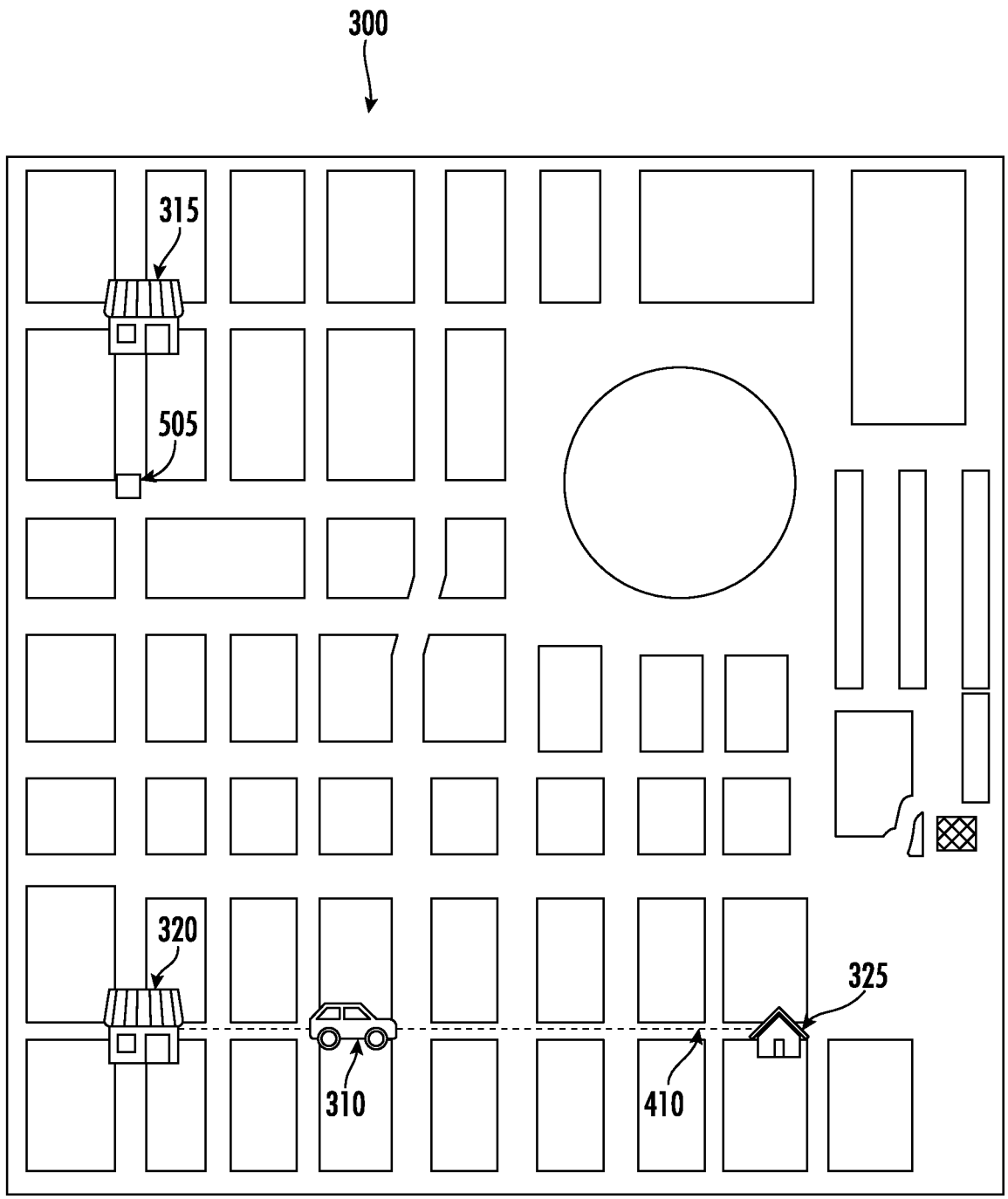

Second courier 310 can pick up the first item (and any additional items) and the second item (and any additional items) from second grocery location 320. As depicted in FIG. 10, second courier 310 can transport the plurality of items from second grocery location 320 to destination location 325 (e.g., along expected route 410).

Figure 11:
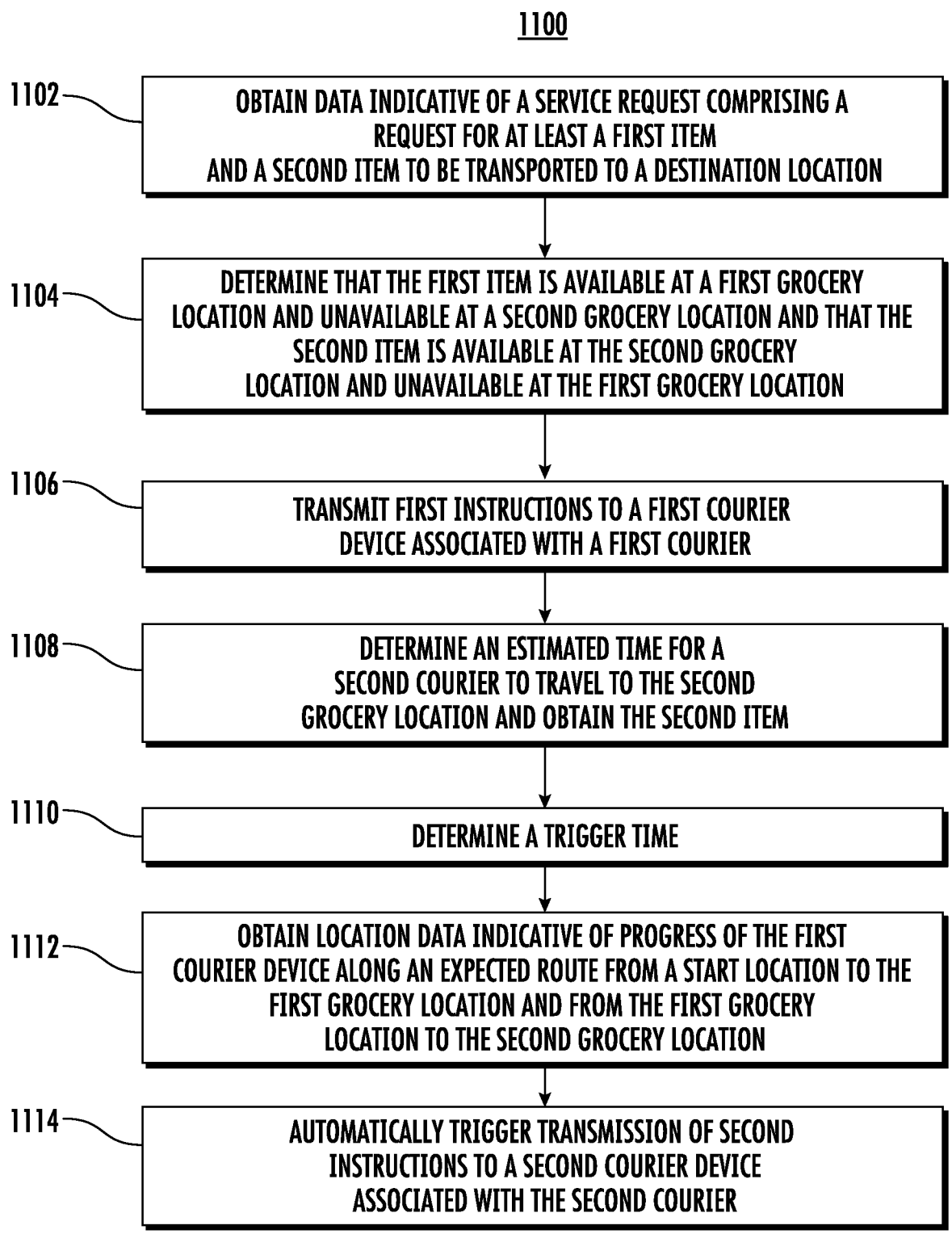
FIG. 11 depicts a flowchart of an example method according to example embodiments of the present disclosure.

FIG. 11 depicts a flowchart diagram of an example method for strategic routing and distribution of orders for multi-location merchants. One or more portion(s) of the method 1100 can be implemented by one or more computing devices such as, for example, the computing devices/systems described in FIG. 1, FIG. 12, and FIG. 13. Moreover, one or more portion(s) of the method 1100 can be implemented as an algorithm on the hardware components of the device(s) described herein (e.g., as in FIG. 1, FIG. 12, and FIG. 13). For example, a computing system can include one or more processors and one or more non-transitory, computer-readable media storing instructions that are executable by the one or more processors to cause the computing system to perform operations, the operations including one or more of the operations/portions of method 1100. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure.

At (1102), method 1100 can include obtaining data indicative of a service request including a request for at least a first item and a second item to be transported to a destination location. For instance, a computing system (e.g., an operations computing system associated with a service entity) can obtain data indicative of a service request including a request for at least a first item and a second item to be transported to a destination location.

By way of example, a user of a delivery service can initiate a delivery request via a software application running on a user device (e.g., mobile phone). The software application can cause the user device to render a user interface for the user to interact with via a display screen. In an example, the user interface can include an interactive elements that allow for a user to search for and select items and merchants. This can include, for example, selecting grocery items for purchase via a grocery store.

At (1104), method 1100 can include determining that the first item is available at a first grocery location and unavailable at a second grocery location and that the second item is available at the second grocery location and unavailable at the first grocery location. For instance, a computing system (e.g., an operations computing system associated with a service entity) can determine that the first item is available at a first grocery location and unavailable at a second grocery location and that the second item is available at the second grocery location and unavailable at the first grocery location. As described herein, the first grocery location and the second grocery location can be associated with a single brand. As described herein, the first grocery location and the second grocery location can be associated with different brands.

By way of example, a user of a delivery service can select eggs and milk for purchase via a user interface of the software application. The eggs can be available at the first grocery location and unavailable at the second grocery location and the milk can be available at the second grocery location and unavailable at the first grocery location.

In some implementations, method 1100 can include generating a combined inventory of the first grocery location and the second grocery location. For instance, as described herein, generating the combined inventory can be based at least in part on: (i) courier availability, (ii) the inventory for the first grocery location, (iii) the inventory for the second grocery location, (iv) historical user data, (v) user location, (vi) location of the first grocery location or (vii) location of the second grocery location. By way of example, the combined inventory can include the eggs and milk within a single listing that is displayed via the user interface.

In some implementations, method 1100 can include determining an availability of couriers in an area to facilitate service request completions. For instance, the computing system can obtain data indicative of a number of couriers that are online, have an active status, or have a status indicative of availability to complete a service request.

For instance, method 1100 can include determining that the availability of the couriers is above a threshold. As described herein, the threshold can represent a threshold number of active couriers can be indicative of a number of couriers being active in a geographic area to adequately perform a plurality of current or predicted future vehicle service requests. A number of active couriers that exceeds the threshold number of active couriers (e.g., 2, 3, 4, 5, etc.) can be indicative of a surplus of available couriers to perform expected vehicle service requests within the geographic region. A number of active couriers that does not exceed the threshold number of active couriers can be indicative of an undersupply of active couriers in a geographic area to perform expected vehicle service requests within the geographic region.

In response to determining that the availability of the couriers is above the threshold, transmitting data including instructions that when executed by a client device cause the combined inventory to be provided for display via a user interface of a client device. For instance, the user interface can include the milk available at the first grocery location listed alongside the eggs available at the second grocery location. By way of example, method 1100 can include determining a first courier to pick up the first item at the first grocery location and transport the first item from the first grocery location to the second grocery location. A first courier to pick up the first item at the first grocery location can be chosen based on a distance from the first courier to the first grocery location or an expected time to pack (e.g., compared to other available courier distances from the first grocery location).

Method 1100 can include determining a second courier to obtain the second item and the first item at the second grocery location. The second courier can be determined based on the distance between the second courier and the second grocery location, the estimated time to pack at the second grocery location, the estimated time between the first grocery location and the second grocery location, and the estimated time to pack for the first courier associated with the first grocery location. In some implementations, the second courier can be the closest courier to second grocery location. In some implementations, the computing system can determine that the first courier's time to travel to the first location, pack the first items, and travel to the second grocery location is higher than a first candidate courier for the second portion of the service request. In response, the computing system can determine a second candidate courier for the second portion of the service request that is farther away from the second grocery location than the first candidate courier. The computing system can select the second candidate courier as the second courier based on the second candidate courier having an estimated time of arrival to the second grocery location and estimated time to pack that is closer to the estimated time for the first courier to travel to first grocery location, pack the first item, and travel to the second grocery location.

For instance, method 1100 can include determining that the availability of the couriers is below a threshold (e.g., the number of couriers within a certain distance/time of the store locations is below a threshold distance/time). In response to determining that the availability of the couriers is below the threshold, the method 1100 can include transmitting data including instructions that when executed by a client device cause the inventory of the first grocery location to be displayed separately from the inventory of the second grocery location via a user interface of the client device. By way of example, the computing system can provide the eggs in an inventory associated with the first grocery location presented separately from the milk in an inventory associated with the second grocery location.

In some implementations, method 1100 can include determining whether to provide an option for a multi-courier order delivery (e.g., multi-courier fulfillment of a service request) based on: (i) courier availability, (ii) the inventory for the first grocery location, (iii) the inventory for the second grocery location, (iv) historical user data, (v) user location, (vi) location of the first grocery location or (vii) location of the second grocery location.

Courier availability can be associated with a number of active couriers (e.g., couriers actively providing services, couriers available to accept new service requests, or couriers expected to become available during a future time interval). The inventory for the first grocery location can be indicative of a quantity of items associated with a particular item identifier located at the first grocery location. The inventory for the second grocery location can be indicative of a quantity of items associated with a particular item identifier located at the second grocery location. Historical user data can include data as discussed herein (e.g., as described in FIG. 1 and FIG. 2). User location can include a physical geographic location associated with a user (e.g., determined by obtaining user input, determined by obtaining sensor data associated with one or more devices associated with the user). The location of the first grocery location can be a physical geographic location associated with the first grocery location. The location of the second grocery location can be a physical geographic location associated with the second grocery location.

Based on overall system resources, the computing system can provide a listing of item offerings to a user (e.g., displayed via a user interface of a client device). For instance, the computing system can determine that there are adequate system resources to facilitate a multi-courier order delivery (e.g., the number of available couriers is above a threshold). In some implementations, the adequacy of system resources can be determined based on a comparison of a plurality of merchant locations (e.g., grocery locations). For instance, real-time data associated with traffic, weather, courier supply, and the like can be used to determine a distance or time between a first grocery location and a second grocery location. The distance or time between the first grocery location and second grocery location can be compared to a threshold distance or time.

For example, the first grocery location and second grocery location can be 20 miles away from one another, multi-courier order delivery may be unavailable (and thus a combined inventory would not be generated by the computing system). In some implementations, the first grocery location and second grocery location can be located within a threshold distance from each other. The distance can be a haversine distance, travel distance, estimated time of transit. The estimated time of transit or the distance can be determined in real-time (or near real-time) based on data such as weather or traffic.

The threshold distance or time can be a static distance or time (e.g., set to a specific number of miles or minutes). Additionally or alternatively, the threshold distance or time can be dynamic. For example, the threshold distance or time between the first grocery location and the second grocery location can change based on time of day, courier availability, traffic, user location, or other factors.

By way of example, the listing of item offerings can be determined based on the courier availability, inventory for the grocery locations, historical user data associated with preference, location of a user, or location of respective grocery locations. The computing system can maintain an inventory for each respective grocery location and can generate custom item offerings for users that combine offerings from multiple brick-and-mortar locations associated with a particular brand.

In some implementations, the computing system can determine that there are inadequate system resources to facilitate a multi-courier order delivery (e.g., the number of available couriers is below a threshold). In these instances, the customer offerings for the user can be adjusted to show offerings for a single brick-and-mortar location associated with a particular brand. For example, instead of a single listing of items associated with Brand W Grocery, there can be a listing of items associated with Brand W Grocery's location on ABC Avenue and a second listing of items associated with Brand W Grocery's location on XYZ Avenue. The computing system can determine which store to display the inventory of based on courier supply, geographic location of the destination location, geographic location of the grocery location, or historical user preference At (1106), method 1100 can include transmitting first instructions to a first courier device associated with a first courier. For instance, a computing system (e.g., an operations computing system associated with a service entity) can transmit first instructions to a first courier device associated with a first courier. As described herein, the first instructions can be executed by the first courier device to cause a first service assignment to be provided for display via a user interface of the first courier device. For instance, the first service assignment can indicate the first courier is to transport the first item from the first grocery location to the second grocery location.

By way of example, first instructions can include instructions for the first courier associated with the first courier device obtaining eggs from first grocery location and transporting the eggs from the first grocery location to the second grocery location.

At (1108), method 1100 can include determining an estimated time for a second courier to travel to the second grocery location and obtain the second item. For instance, a computing system (e.g., an operations computing system associated with a service entity) can determine an estimated time for a second courier to travel to the second grocery location and obtain the second item. As described herein, in some implementations, the trigger time can be configured such that the first instructions are transmitted to the first courier device at a concurrent timeframe as the second instructions are sent. In some implementations, the trigger time can be a time before the first courier has arrived at the first grocery location. In some implementations, the trigger time can be a time after the first courier has left the first grocery location and before arriving to the second grocery location. In some embodiments, the trigger time can be associated with a geographic location along the expected route.

By way of example, the computing system can determine that the estimated time for the second courier to travel to the second grocery location and obtain the milk is 10 minutes.

At (1110), method 1100 can include determining a trigger time. For instance, a computing system (e.g., an operations computing system associated with a service entity) can determine a trigger time. As described herein, determining the trigger time can be based on the estimated time for the second courier to travel to the second grocery location and obtain the second item. For instance, determining the trigger time is based on: (i) an estimated time to pack one or more items at the second grocery location, (ii) a location of the second courier, (iii) a location of the first grocery location, or (iv) a location of the second grocery location. An estimated time to pack one or more items at the second grocery location can include a time it takes to gather items within the second grocery location. The estimated time to pack can be based on factors including number of items, quantity of items, location of items, packer history. Location of the second courier can indicate a current location of the courier (e.g., associated with the physical geographic location of the second courier). The location of the first grocery location can be a physical geographic location of the first grocery location. The location of the second location can be a physical geographic location of the second grocery location.

By way of example, the trigger time can be determined to be a time at which the first courier is 10 minutes away from traveling to the first grocery location, obtaining the eggs, and traveling from the first grocery location to the second grocery location to drop off the eggs. The trigger time can be before the first courier arrives at the first grocery location, while the first courier is within the first grocery location, or after a first courier has departed the first grocery location.

At (1112), method 1100 can include obtaining location data indicative of progress of the first courier device along an expected route from a start location to the first grocery location and from the first grocery location to the second grocery location. For instance, a computing system (e.g., an operations computing system associated with a service entity) can obtain location data indicative of progress of the first courier device along an expected route from a start location to the first grocery location and from the first grocery location to the second grocery location.

By way of example, location data associated with the current location of the first courier can be obtained. In some implementations the current location can be indicative of the first courier approaching the first grocery location, being within the first grocery location, or departing from the first grocery location.

At (1114), method 1100 can include automatically triggering transmission of second instructions to a second courier device associated with the second courier. For instance, a computing system (e.g., an operations computing system associated with a service entity) can automatically trigger transmission of second instructions to a second courier device associated with the second courier. As described herein, automatically triggering transmission of the second instructions to the second courier device associated with the second courier can be based on the progress of the first courier device along the expected route and the trigger time. As described herein, the second instructions can be executed by the second courier device to cause a second service assignment to be provided for display via a user interface of the second courier device. By way of example, the second service assignment can indicate the second courier is to transport items to the destination location.

By way of example, the computing system can determine that the first courier's progress has passed a time (or location) associated with the trigger time. For instance, the computing system can determine that the device associated with the first courier has passed a progress point associated with the trigger time (e.g., is within the expected time of the second courier to complete the second portion of the service request). In response, the computing system can transmit instructions to the second courier to complete the second portion of the service request.

Figure 12:
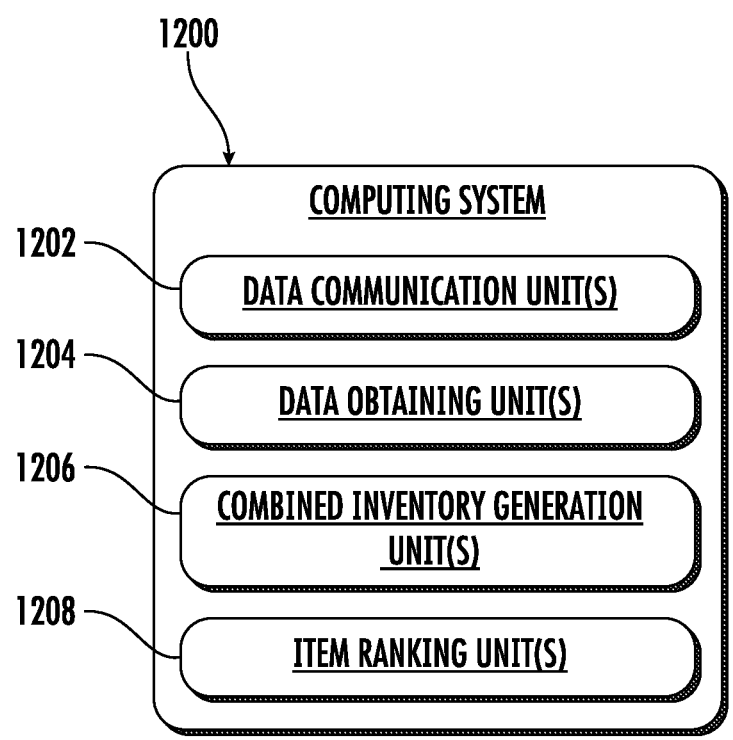
FIG. 12 and FIG. 13 depict block diagrams of example systems according to example embodiments of the present disclosure.

Various means can be configured to perform the methods and processes described herein. For example, FIG. 12 depicts an example computing system 1200 that includes various means according to example embodiments of the present disclosure. The computing system 1200 can be or otherwise include, for example, an operations computing system, etc. The computing system 1200 can include data communication unit(s) 1202, data obtaining unit(s) 1204, combined inventory generation unit(s) 1206, item ranking unit(s) 1208, or other means for performing the operations and functions described herein. In some implementations, one or more of the units can be implemented separately. In some implementations, one or more units can be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), or other suitable hardware.

The means can be programmed to perform one or more algorithm(s) for carrying out the operations and functions described herein. For instance, the means (e.g., data communication unit(s) 1202) can be configured to communicate data indicative of a request for a courier to perform a delivery service associated with a multi-courier delivery service request (e.g., a first service assignment or a second service assignment).

In addition, the means (e.g., data obtaining unit(s) 1204) can be configured to obtain data associated with a multi-courier delivery service request. For example, multi-courier delivery service requests can be indicative of a pick-up location, merchant, item, or drop-off location associated with a multi-courier delivery service request. In addition, in some implementations, the means (e.g., the data obtaining unit(s) 1204) can obtain data associated with one or more couriers, one or more merchants, or map data indicative of one or more geographic areas.

In addition, the means (e.g., combined inventory generation unit(s) 1206) can be configured to generate one or more combined inventories for a plurality of merchants. For example, the combined inventories can include items in stock at a first grocery location and items in stock at a second grocery location.

In addition, the means (e.g., item ranking unit(s) 1208) can be configured to determine a ranking of items (e.g., of a combined inventory) for display on a user device. In addition, or alternatively, the item listing for display can be ranked based on contextual data, historical data, or user data.

These described functions of the means are provided as examples and are not meant to be limiting. The means can be configured for performing any of the operations and functions described herein.

Figure 13:
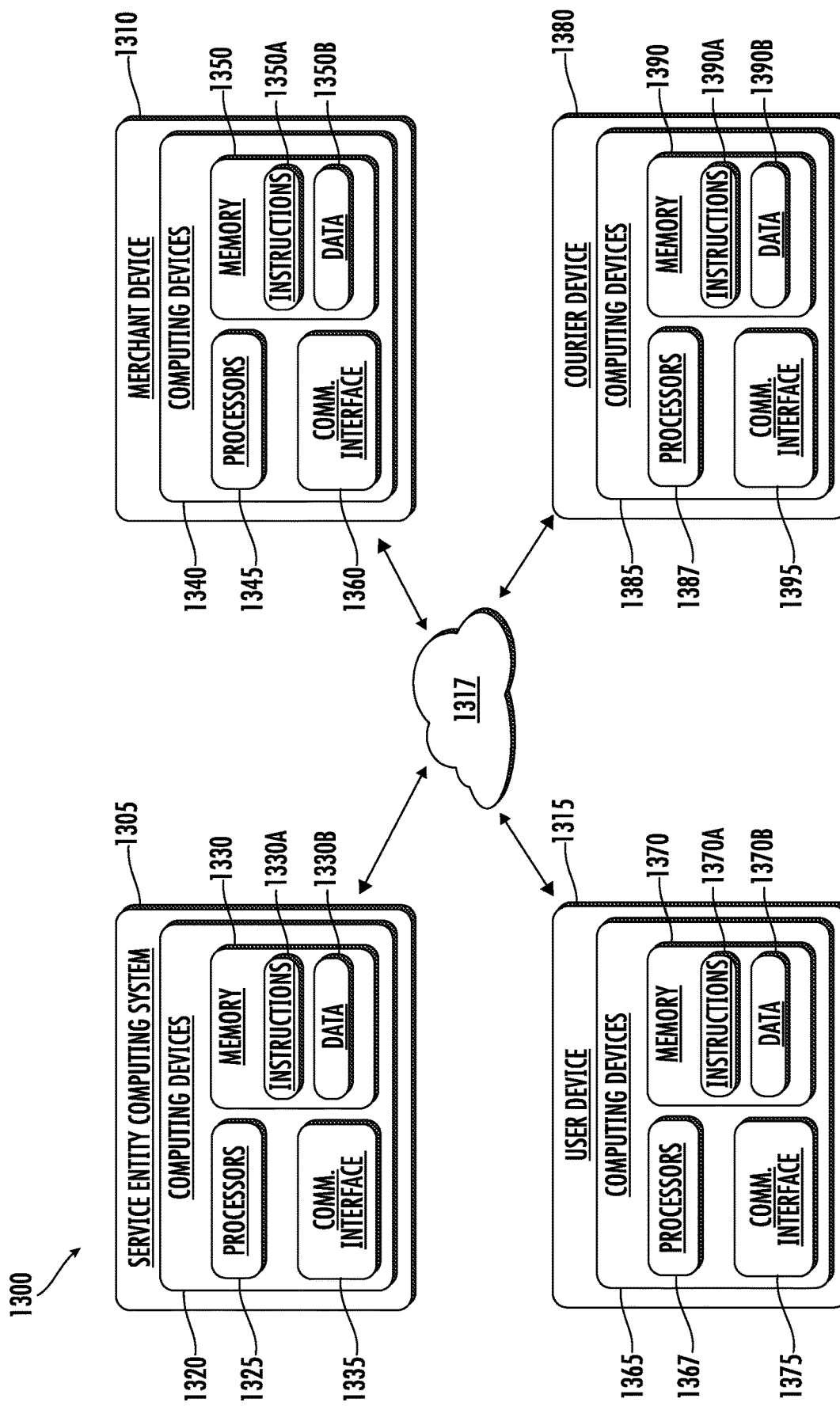

FIG. 13 depicts a block diagram of an example system 1300 for implementing systems and methods according to example embodiments of the present disclosure. The example system 1300 illustrated in FIG. 13 is provided as an example only. The components, systems, connections, or other aspects illustrated in FIG. 13 are optional and are provided as examples of what is possible, but not required, to implement the present disclosure. The example system 1300 can include a service entity computing system 1305 (e.g., that is associated with a delivery service entity or service provider). The example system 1300 can include one or more merchant devices 1310 (e.g., that are associated with one or more merchants). The example system 1300 can include one or more user devices 1315 (e.g., user device of the user). The example system 1300 can include one or more courier devices 1380 (e.g., user device of the operator, user device of the vehicle). One or more of the service entity computing system 1305, the merchant device 1310, the user device 1315, or the courier device 1380 can be communicatively coupled to one another over one or more communication network(s) 1317. The networks 1317 can correspond to any of the networks described herein.

The computing device(s) 1320 of the service entity computing system 1305 can include processor(s) 1325 and a memory 1330. The one or more processors 1325 can be any suitable processing device (e.g., a processor core, a microprocessor, an ASIC, a FPGA, a controller, a microcontroller) and can be one processor or a plurality of processors that are operatively connected. The memory 1330 can include one or more non-transitory computer-readable storage media, such as RAM, ROM, EEPROM, EPROM, one or more memory devices, flash memory devices, data registrar, etc., and combinations thereof.

The memory 1330 can store information that can be accessed by the one or more processors 1325. For example, the memory 1330 (e.g., one or more non-transitory computer-readable storage mediums, memory devices) can include computer-readable instructions 1330A that can be executed by the one or more processors 1325. The instructions 1330A can be software written in any suitable programming language or can be implemented in hardware. Additionally or alternatively, the instructions 1330A can be executed in logically or virtually separate threads on processor(s) 1325.

For example, the memory 1330 can store instructions 1330A that when executed by the one or more processors 1325 cause the one or more processors 1325 (the service entity computing system 1305) to perform operations such as any of the operations and functions of the computing system(s) (e.g., operations computing system) described herein (or for which the system(s) are configured), one or more of the operations and functions for communicating between the computing systems, one or more portions/operations of method 1100, or one or more of the other operations and functions of the computing systems described herein.

The memory 1330 can store data 1330B that can be obtained (e.g., acquired, received, retrieved, accessed, created, stored). The data 1330B can include, for example, any of the data/information described herein. In some implementations, the computing device(s) 1320 can obtain data from one or more memories that are remote from the service entity computing system 1305.

The computing device(s) 1320 can also include a communication interface 1335 used to communicate with one or more other system(s) remote from the service entity computing system 1305, such as merchant device 1310, user device 1315, or courier device 1380. The communication interface 1335 can include any circuits, components, software, etc. for communicating via one or more networks (e.g., network(s) 1317). The communication interface 1335 can include, for example, one or more of a communications controller, receiver, transceiver, transmitter, port, conductors, software or hardware for communicating data.

The merchant device 1310 can include one or more computing device(s) 1340 that are remote from the service entity computing system 1305, the user device 1315, and the courier device 1380. The computing device(s) 1340 can include one or more processors 1345 and a memory 1350. The one or more processors 1345 can be any suitable processing device (e.g., a processor core, a microprocessor, an ASIC, a FPGA, a controller, a microcontroller) and can be one processor or a plurality of processors that are operatively connected. The memory 1350 can include one or more tangible, non-transitory computer-readable storage media, such as RAM, ROM, EEPROM, EPROM, one or more memory devices, flash memory devices, data registrar, etc., and combinations thereof.

The memory 1350 can store information that can be accessed by the one or more processors 1345. For example, the memory 1350 (e.g., one or more tangible, non-transitory computer-readable storage media, one or more memory devices) can include computer-readable instructions 1350A that can be executed by the one or more processors 1345. The instructions 1350A can be software written in any suitable programming language or can be implemented in hardware. Additionally or alternatively, the instructions 1350A can be executed in logically or virtually separate threads on processor(s) 1345.

For example, the memory 1350 can store instructions 1350A that when executed by the one or more processors 1345 cause the one or more processors 1345 to perform operations such as any of the operations and functions of the computing system(s) (e.g., merchant server) described herein (or for which the system(s) are configured), one or more of the operations and functions for communicating between computing systems, one or more portions/operations of method 1100, or one or more of the other operations and functions of the computing systems described herein. The memory 1350 can store data 1350B that can be obtained. The data 1350B can include, for example, any of the data/information described herein.

The computing device(s) 1340 can also include a communication interface 1360 used to communicate with one or more system(s) that are remote from the merchant device 1310. The communication interface 1360 can include any circuits, components, software, etc. for communicating via one or more networks (e.g., network(s) 1317). The communication interface 1360 can include, for example, one or more of a communications controller, receiver, transceiver, transmitter, port, conductors, software or hardware for communicating data.

The user device 1315 can include one or more computing device(s) 1365 that are remote from the service entity computing system 1305, the merchant device 1310, and the courier device 1380. The computing device(s) 1365 can include one or more processors 1367 and a memory 1370. The one or more processors 1367 can be any suitable processing device (e.g., a processor core, a microprocessor, an ASIC, a FPGA, a controller, a microcontroller) and can be one processor or a plurality of processors that are operatively connected. The memory 1370 can include one or more tangible, non-transitory computer-readable storage media, such as RAM, ROM, EEPROM, EPROM, one or more memory devices, flash memory devices, data registrar, etc., and combinations thereof.

The memory 1370 can store information that can be accessed by the one or more processors 1367. For example, the memory 1370 (e.g., one or more tangible, non-transitory computer-readable storage media, one or more memory devices) can include computer-readable instructions 1370A that can be executed by the one or more processors 1367. The instructions 1370A can be software written in any suitable programming language or can be implemented in hardware. Additionally or alternatively, the instructions 1370A can be executed in logically or virtually separate threads on processor(s) 1367.

For example, the memory 1370 can store instructions 1370A that when executed by the one or more processors 1367 cause the one or more processors 1367 to perform operations such as any of the operations and functions of the computing system(s) (e.g., user devices) described herein (or for which the user device(s) are configured), one or more of the operations and functions for communicating between systems, one or more portions/operations of method 1100, or one or more of the other operations and functions of the computing systems described herein. The memory 1370 can store data 1370B that can be obtained. The data 1370B can include, for example, any of the data/information described herein.

The computing device(s) 1365 can also include a communication interface 1375 used to communicate computing device/system that is remote from the user device 1315, such as merchant device 1310, service entity computing system 1305, or courier device 1380. The communication interface 1375 can include any circuits, components, software, etc. for communicating via one or more networks (e.g., network(s) 1317). The communication interface 1375 can include, for example, one or more of a communications controller, receiver, transceiver, transmitter, port, conductors, software or hardware for communicating data.

The computing device(s) 1385 of the courier device 1380 can include processor(s) 1387 and a memory 1390. The one or more processors 1387 can be any suitable processing device (e.g., a processor core, a microprocessor, an ASIC, a FPGA, a controller, a microcontroller) and can be one processor or a plurality of processors that are operatively connected. The memory 1390 can include one or more non-transitory computer-readable storage media, such as RAM, ROM, EEPROM, EPROM, one or more memory devices, flash memory devices, data registrar, etc., and combinations thereof.

The memory 1390 can store information that can be accessed by the one or more processors 1387. For example, the memory 1390 (e.g., one or more non-transitory computer-readable storage mediums, memory devices) can include computer-readable instructions 1390A that can be executed by the one or more processors 1387. The instructions 1390A can be software written in any suitable programming language or can be implemented in hardware. Additionally or alternatively, the instructions 1390A can be executed in logically or virtually separate threads on processor(s) 1387.

For example, the memory 1390 can store instructions 1390A that when executed by the one or more processors 1387 cause the one or more processors 1387 (the courier device 1380) to perform operations such as any of the operations and functions of the display device(s) described herein (or for which such devices are configured), one or more of the operations and functions for communicating between the computing systems/devices, one or more portions/operations of method 1100, or one or more of the other operations and functions of the computing systems described herein.

The memory 1390 can store data 1390B that can be obtained (e.g., acquired, received, retrieved, accessed, created, stored). The data 1390B can include, for example, any of the data/information described herein. In some implementations, the computing device(s) 1385 can obtain data from one or more memories that are remote from the courier device 1380.

The computing device(s) 1385 can also include a communication interface 1395 used to communicate with one or more other system(s) remote from the courier device 1380, such as merchant device 1310, user device 1315, or service entity computing system 1305. The communication interface 1395 can include any circuits, components, software, etc. for communicating via one or more networks (e.g., network(s) 1317). The communication interface 1395 can include, for example, one or more of a communications controller, receiver, transceiver, transmitter, port, conductors, software or hardware for communicating data.

The network(s) 1317 can be any type of network or combination of networks that allows for communication between devices. In some implementations, the network(s) 1317 can include one or more of a local area network, wide area network, the Internet, secure network, cellular network, mesh network, peer-to-peer communication link or some combination thereof and can include any number of wired or wireless links. Communication over the network(s) 1317 can be accomplished, for example, via a communication interface using any type of protocol, protection scheme, encoding, format, packaging, etc.

Computing tasks discussed herein as being performed at certain computing device(s)/systems can instead be performed at another computing device/system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some implementations are described with a reference numeral for example illustrated purposes and are not meant to be limiting.

What is claimed is:

1. A computer-implemented method comprising:

obtaining data indicative of a service request comprising a request for at least a first item and a second item to be transported to a destination location, wherein the first item and the second item are selected from a combined inventory associated with a single brand of merchant;

determining that the first item is available at a first grocery location and unavailable at a second grocery location and that the second item is available at the second grocery location and unavailable at the first grocery location, wherein the first grocery location and the second grocery location are associated with the single brand of merchant;

transmitting first instructions to a first courier device associated with a first courier, wherein the first instructions can be executed by the first courier device to cause a first service assignment to be provided for display via a user interface of the first courier device, the first service assignment indicating the first courier is to transport the first item from the first grocery location to the second grocery location;

determining an estimated time for a second courier to travel to the second grocery location and obtain the second item;

based on the estimated time for the second courier to travel to the second grocery location and obtain the second item, determining a trigger time;

obtaining location data indicative of progress of the first courier device along an expected route from a start location to the first grocery location and from the first grocery location to the second grocery location; and based on the progress of the first courier device along the expected route and the trigger time, automatically triggering transmission of second instructions to a second courier device associated with the second courier, wherein the second instructions can be executed by the second courier device to cause a second service assignment to be provided for display via a user interface of the second courier device, the second service assignment indicating the second courier is to transport items to the destination location.

2. The method of claim 1, comprising:

determining an inventory for at least the first grocery location and the second grocery location;

generating the combined inventory of the first grocery location and the second grocery location; and determining an availability of couriers in an area to facilitate service request completions.

3. The method of claim 2 comprising:

determining that the availability of the couriers is above a threshold; and in response to determining that the availability of the couriers is above the threshold, transmitting data comprising instructions that when executed by a client device cause the combined inventory to be provided for display via a user interface of a client device.

4. The method of claim 2, comprising:

determining that the availability of the couriers is below a threshold; and in response to determining that the availability of the couriers is below the threshold, transmitting data comprising instructions that when executed by a client device cause the inventory of the first grocery location to be displayed separately from the inventory of the second grocery location via a user interface of the client device.

5. The method of claim 2, wherein generating the combined inventory is based at least in part on (i) courier availability, (ii) the inventory for the first grocery location, (iii) the inventory for the second grocery location, (iv) historical user data, (v) user location, (vi) location of the first grocery location or (vii) location of the second grocery location.

6. The method of claim 1, wherein determining the trigger time is based at least in part on (i) an estimated time to pack one or more items at the second grocery location, (ii) a location of the second courier, (iii) a location of the first grocery location, or (iv) a location of the second grocery location.

7. The method of claim 1, comprising:
determining a first courier to pick-up the first item at the first grocery location and transport the first item from the first grocery location to the second grocery location; and
determining a second courier to obtain the second item and the first item at the second grocery location.

8. The method of claim 1, wherein the trigger time is the time that the first instructions are transmitted to the first courier device such that the second instructions are sent simultaneously to the first instructions.

9. The method of claim 1, wherein the trigger time is a time after the first courier has left the first grocery location and before arriving to the second grocery location.

10. The method of claim 1, wherein the trigger time is associated with a geographic location along the expected route.

11. A computing system comprising:
one or more processors; and
one or more non-transitory, computer-readable media storing instructions that are executable by the one or more processors to cause the computing system to perform operations, the operations comprising:
obtaining data indicative of a service request comprising a request for at least a first item and a second item to be transported to a destination location, wherein the first item and the second item are selected from a combined inventory associated with a single brand of merchant;
determining that the first item is available at a first grocery location and unavailable at a second grocery location and that the second item is available at the second grocery location and unavailable at the first grocery location, wherein the first grocery location and the second grocery location are associated with the single brand of merchant;
transmitting first instructions to a first courier device associated with a first courier, wherein the first instructions can be executed by the first courier device to cause a first service assignment to be provided for display via a user interface of the first courier device, the first service assignment indicating the first courier is to transport the first item from the first grocery location to the second grocery location;
determining an estimated time for a second courier to travel to the second grocery location and obtain the second item;
based on the estimated time for the second courier to travel to the second grocery location and obtain the second item, determining a trigger time;
obtaining location data indicative of progress of the first courier device along an expected route from a start location to the first grocery location and from the first grocery location to the second grocery location; and
based on the progress of the first courier device along the expected route and the trigger time, automatically triggering transmission of second instructions to a second courier device associated with the second courier, wherein the second instructions can be executed by the second courier device to cause a second service assignment to be provided for display via a user interface of the second courier device, the second service assignment indicating the second courier is to transport items to the destination location.

12. The system of claim 11, the operations comprising:
determining an inventory for at least the first grocery location and the second grocery location;
generating the combined inventory of the first grocery location and the second grocery location; and
determining an availability of couriers in an area to facilitate service request completions.

13. The system of claim 12, the operations comprising:
determining that the availability of the couriers is above a threshold; and
in response to determining that the availability of the couriers is above the threshold, transmitting data comprising instructions that when executed by a client device cause the combined inventory to be provided for display via a user interface of a client device.

14. The system of claim 12, the operations comprising:
determining that the availability of the couriers is below a threshold; and
in response to determining that the availability of the couriers is below the threshold, transmitting data comprising instructions that when executed by a client device cause the inventory of the first grocery location to be displayed separately from the inventory of the second grocery location via a user interface of the client device.

15. The system of claim 12, wherein generating the combined inventory is based at least in part on (i) courier availability, (ii) the inventory for the first grocery location, (iii) the inventory for the second grocery location, (iv) historical user data, (v) user location, (vi) location of the first grocery location or (vii) location of the second grocery location.

16. The system of claim 11, wherein determining the trigger time is based at least in part on (i) an estimated time to pack one or more items at the second grocery location, (ii) a location of the second courier, (iii) a location of the first grocery location, or (iv) a location of the second grocery location.

17. The system of claim 11, the operations comprising:
determining a first courier to pick-up the first item at the first grocery location and transport the first item from the first grocery location to the second grocery location; and
determining a second courier to obtain the second item and the first item at the second grocery location.

18. The system of claim 11, wherein the trigger time is the time that the first instructions are transmitted to the first courier device such that the second instructions are sent simultaneously to the first instructions.

19. The system of claim 11, wherein the trigger time is a time after the first courier has left the first grocery location and before arriving to the second grocery location.

20. One or more non-transitory computer readable media storing instructions that are executable by one or more processors to perform operations comprising:

obtaining data indicative of a service request comprising a request for at least a first item and a second item to be transported to a destination location, wherein the first item and the second item are selected from a combined inventory associated with a single brand of merchant;

determining that the first item is available at a first grocery location and unavailable at a second grocery location and that the second item is available at the second grocery location and unavailable at the first grocery location, wherein the first grocery location and the second grocery location are associated with the single brand of merchant;

transmitting first instructions to a first courier device associated with a first courier, wherein the first instructions can be executed by the first courier device to cause a first service assignment to be provided for display via a user interface of the first courier device, the first service assignment indicating the first courier is to transport the first item from the first grocery location to the second grocery location;

determining an estimated time for a second courier to travel to the second grocery location and obtain the second item;

based on the estimated time for the second courier to travel to the second grocery location and obtain the second item, determining a trigger time;

obtaining location data indicative of progress of the first courier device along an expected route from a start location to the first grocery location and from the first grocery location to the second grocery location; and based on the progress of the first courier device along the expected route and the trigger time, automatically triggering transmission of second instructions to a second courier device associated with the second courier, wherein the second instructions can be executed by the second courier device to cause a second service assignment to be provided for display via a user interface of the second courier device, the second service assignment indicating the second courier is to transport items to the destination location.

\* \* \* \* \*